Jan. 29, 1963 C. V. HICKMAN ETAL 3,075,434

AMMUNITION TRANSFER MECHANISM

Filed Aug. 27, 1952 19 Sheets-Sheet 1

INVENTORS
CARL V. HICKMAN, DECEASED
BY JEAN W. HICKMAN, ADMRX.
RICHARD E. TAYLOR
ROBERT BUTTERWORTH
HERMAN G. MILLER
ALVAH E. YOUNG
WILLIAM M. POWELL

BY W. O. Duesenberry
Claude Funkhouser ATTORNEYS

AMMUNITION TRANSFER MECHANISM

Filed Aug. 27, 1952 19 Sheets-Sheet 2

INVENTORS
CARL V. HICKMAN, DECEASED
BY JEAN W. HICKMAN, ADMRX.
RICHARD E. TAYLOR
ROBERT BUTTERWORTH
HERMAN G. MILLER
ALVAH E. YOUNG
WILLIAM M. POWELL
BY
W. O. Quesenberry
Claude Funkhouser
ATTORNEYS

AMMUNITION TRANSFER MECHANISM

Filed Aug. 27, 1952 19 Sheets-Sheet 3

INVENTORS
CARL V. HICKMAN, DECEASED
BY JEAN W. HICKMAN, ADMRX.
RICHARD E. TAYLOR
ROBERT BUTTERWORTH
HERMAN G. MILLER
ALVAH E. YOUNG
WILLIAM M. POWELL

BY W. O. Duesenberry
Claude Funkhouser ATTORNEYS

AMMUNITION TRANSFER MECHANISM

INVENTORS
CARL V. HICKMAN, DECEASED
BY JEAN W. HICKMAN, ADMRX.
RICHARD E. TAYLOR
ROBERT BUTTERWORTH
HERMAN G. MILLER
ALVAH E. YOUNG
WILLIAM M. POWELL
BY
W. O. Luxemburg
Claude Funkhouser
ATTORNEYS INVENTORS
CARL V. HICKMAN, DECEASED
BY JEAN W. HICKMAN, ADMRX.
RICHARD E. TAYLOR
ROBERT BUTTERWORTH
HERMAN G. MILLER
ALVAH E. YOUNG
WILLIAM M. POWELL BY W. O. Quesenberry
Claude Funkhouser ATTORNEYS INVENTORS
CARL V. HICKMAN, DECEASED
BY JEAN W. HICKMAN, ADMRX.
RICHARD E. TAYLOR
ROBERT BUTTERWORTH
HERMAN G. MILLER
ALVAH E. YOUNG
WILLIAM M. POWELL
BY W. O. Quesenberry
Claude Funkhouser ATTORNEYS Jan. 29, 1963 C. V. HICKMAN ETAL 3,075,434

AMMUNITION TRANSFER MECHANISM

Filed Aug. 27, 1952 19 Sheets-Sheet 7

INVENTORS
CARL V. HICKMAN, DECEASED
BY JEAN W. HICKMAN, ADMRX.
RICHARD E. TAYLOR
ROBERT BUTTERWORTH
HERMAN G. MILLER
ALVAH E. YOUNG
WILLIAM M. POWELL

BY W. O. Quesenberry
Claude Funkhouser ATTORNEYS

INVENTORS
CARL V. HICKMAN, DECEASED
BY JEAN W. HICKMAN, ADMRX.
RICHARD E. TAYLOR
ROBERT BUTTERWORTH
HERMAN G. MILLER
ALVAH E. YOUNG
WILLIAM M. POWELL
BY
W. O. Quesenberry
Claude Funkhouser ATTORNEYS

AMMUNITION TRANSFER MECHANISM

Filed Aug. 27, 1952 19 Sheets-Sheet 9

INVENTORS
CARL V. HICKMAN, DECEASED
BY JEAN W. HICKMAN, ADMRX.
RICHARD E. TAYLOR
ROBERT BUTTERWORTH
HERMAN G. MILLER
ALVAH E. YOUNG
WILLIAM M. POWELL
BY
W. O. Duesenberry
Claude Funkhouser ATTORNEYS

AMMUNITION TRANSFER MECHANISM

Filed Aug. 27, 1952 19 Sheets-Sheet 10

INVENTORS
CARL V. HICKMAN, DECEASED
BY JEAN W. HICKMAN, ADMRX.
RICHARD E. TAYLOR
ROBERT BUTTERWORTH
HERMAN G. MILLER
ALVAH E. YOUNG
WILLIAM M. POWELL
BY W. O. Quesenberry
Claude Funkhouser ATTORNEYS

AMMUNITION TRANSFER MECHANISM

Filed Aug. 27, 1952 19 Sheets-Sheet 11

INVENTORS
CARL V. HICKMAN, DECEASED
BY JEAN W. HICKMAN, ADMRX.
RICHARD E. TAYLOR
ROBERT BUTTERWORTH
HERMAN G. MILLER
ALVAH E. YOUNG
WILLIAM M. POWELL
BY
W. O. Quesenberry
Claude Funkhouser ATTORNEYS INVENTORS
CARL V. HICKMAN, DECEASED
BY JEAN W. HICKMAN, ADMRX
RICHARD E. TAYLOR
ROBERT BUTTERWORTH
HERMAN G. MILLER
ALVAH E. YOUNG
WILLIAM M. POWELL BY W. O. Lusenberry
Claude Funkhouser
ATTORNEYS INVENTORS
CARL V. HICKMAN, DECEASED
BY JEAN W. HICKMAN, ADMRX.
RICHARD E. TAYLOR
ROBERT BUTTERWORTH
HERMAN G. MILLER
ALVAH E. YOUNG
WILLIAM M. POWELL BY W. O. Quesenberry
Claude Funkhouser ATTORNEYS Jan. 29, 1963 C. V. HICKMAN ETAL 3,075,434

AMMUNITION TRANSFER MECHANISM

Filed Aug. 27, 1952 19 Sheets-Sheet 14

INVENTORS
CARL V. HICKMAN, DECEASED
BY JEAN W. HICKMAN, ADMRX.
RICHARD E. TAYLOR
ROBERT BUTTERWORTH
HERMAN G. MILLER
ALVAH E. YOUNG
WILLIAM M. POWELL

BY W. O. Quesenberry
Claude Funkhouser ATTORNEYS

INVENTORS
CARL V. HICKMAN, DECEASED
BY JEAN W. HICKMAN, ADMRX.
RICHARD E. TAYLOR
ROBERT BUTTERWORTH
HERMAN G. MILLER
ALVAH E. YOUNG
WILLIAM M. POWELL

BY W. O. Quesenberry
Claude Funkhouser ATTORNEYS

AMMUNITION TRANSFER MECHANISM

Filed Aug. 27, 1952 19 Sheets-Sheet 16

INVENTORS
CARL V. HICKMAN, DECEASED
BY JEAN W. HICKMAN, ADMRX.
RICHARD E. TAYLOR
ROBERT BUTTERWORTH
HERMAN G. MILLER
ALVAH E. YOUNG
WILLIAM M. POWELL

BY W. O. Quesenberry
Claude Funkhouser ATTORNEYS

Jan. 29, 1963 C. V. HICKMAN ETAL 3,075,434

AMMUNITION TRANSFER MECHANISM

Filed Aug. 27, 1952 19 Sheets-Sheet 17

INVENTORS
CARL V. HICKMAN, DECEASED
BY JEAN W. HICKMAN, ADMRX.
RICHARD E. TAYLOR
ROBERT BUTTERWORTH
HERMAN G. MILLER
ALVAH E. YOUNG
WILLIAM M. POWELL

BY W. O. Duesenberry
Claude Funkhouser ATTORNEYS

Jan. 29, 1963 C. V. HICKMAN ETAL 3,075,434

AMMUNITION TRANSFER MECHANISM

Filed Aug. 27, 1952

19 Sheets-Sheet 18

INVENTORS
CARL V. HICKMAN, DECEASED
BY JEAN W. HICKMAN, ADMRX.
RICHARD E. TAYLOR
ROBERT BUTTERWORTH
HERMAN G. MILLER
ALVAH E. YOUNG
WILLIAM M. POWELL

BY W. O. Quesenberry
Claude Funkhouser
ATTORNEYS

Jan. 29, 1963 C. V. HICKMAN ETAL 3,075,434

AMMUNITION TRANSFER MECHANISM

Filed Aug. 27, 1952 19 Sheets-Sheet 19

INVENTORS
CARL V. HICKMAN, DECEASED
BY JEAN W. HICKMAN, ADMRX.
RICHARD E. TAYLOR
ROBERT BUTTERWORTH
HERMAN G. MILLER
ALVAH E. YOUNG
WILLIAM M. POWELL

BY W. O. Duesenberry
Claude Funkhouser ATTORNEYS

United States Patent Office 3,075,434

Patented Jan. 29, 1963

3,075,434

AMMUNITION TRANSFER MECHANISM

Carl V. Hickman, deceased, late of Washington, D.C., by Jean W. Hickman, administratrix, Washington, D.C., and Richard E. Taylor, Washington, D.C., and Robert Butterworth, District Heights, Herman G. Miller, Mayo, Alvah E. Young, Detour, and William M. Powell, Forest Heights, Md., assignors to the United States of America as represented by the Secretary of the Navy Filed Aug. 27, 1952, Ser. No. 306,744
66 Claims. (Cl. 89—45)
(Granted under Title 35, U.S. Code (1952), sec. 266)

The invention described herein may be manufactured and used by or for the Government of the United States of America for governmental purposes without the payment of any royalties thereon or therefor.

This invention relates to improvements in ammunition handling apparatus, primarily intended for use aboard ship but as readily adaptable to use at shore stations and which, conceivably, could be employed in a variety of circumstances wherein it is required to transfer load units from a supply dump to an elevated and rotating target of delivery.

Applying the following description to the primary use of the invention, the problem which it is contrived to meet is that of keeping the feeding of fixed ammunition equal to the firing rate of a rapid-firing gun. Since the latter is expected to keep up a predetermined rate of fire, it is manifest that there must not be any interruption such as can occur when the human factor is relied upon in the feeding cycle.

To the foregoing end, the rotary gun mount is relieved of the necessity of storing and carrying with it any ammunition excepting that which is about to be fired, thus reducing the moment of inertia of the gun mount to as low a value as possible and deriving from the training mechanism the highest possible quickness of response and precision.

Therefore, it is an object of the invention to provide an apparatus for transferring ammunition from an established stationary loading point to a gun feeding mechanism, which according to the instant disclosure is carried by a rotary gun mount, continuously and automatically without interruption of or slowing down the normal rate of fire of the gun.

Another object of the invention is to provide what is known as an off-mount ammunition feed, the significance of which is to segregate the ammunition supply and its delivering machinery to stationary structure beyond the perimeter of the trainable gun mount so as to minimize the load imposed on said mount.

Another object of the invention is to make the transfer mechanism in the form of several concentric ring components, each capable of rotating independently of each other and functioning as ring conveyors, their concentricity providing the easiest possible access both to the ammunition loading assemblies on the outside and to the ammunition off-takes (or gun hoist-feeders) on the inside.

Another object of the invention is to make the foregoing rotating structure in the form of at least three concentric rings, the outer and inner ones of which have shutter assemblies which demarcate the ammunition positions for the respective loading and offtake assemblies, the third or middle ring having a system of shuttles for switching ammunition from waiting positions in the shutter assembiles on the outer ring into vacant shutter assembly positions on the inner ring as such vacancies occur due to ammunition expenditure at the gun.

Another object of the invention is to surround the gun mount and its ammunition hoist (for either single or multiple barrel gun mounts) with a number of ammunition or supply sources, all equipped to feed ammunition to the hoist, the transfer mechanism for getting the ammunition from said sources to the hoist consisting of an annular conveyor operating between the mount and the outlying supply sources, at a rate fast or slow enough to meet either the maximum or minimum rates of ammunition expenditure.

Another object of the invention is to make it a totally automatic act to transfer a round of ammunition from the loading assembly to the ammunition hoist, the chain of events which start the automatic action being the absence of a round from the ammunition entrance of said ammunition hoist.

Another object of the invention is to provide a rotary, dual, annular magazine centered on a fixed gun mount, with loaders located externally of the magazine and offtakes located internally of the magazine, the respective loaders and offtakes delivering and receiving the ammunition in directions substantially tangential to the magazine so as to keep the rounds moving on flow lines easily conforming to the directions of rotation of the ring components of the magazine.

Other objects and many of the attendant advantages of this invention will be readily appreciated as the same becomes better understood by reference to the following detailed description when considered in connection with the accompanying drawings wherein.

Figure 1:
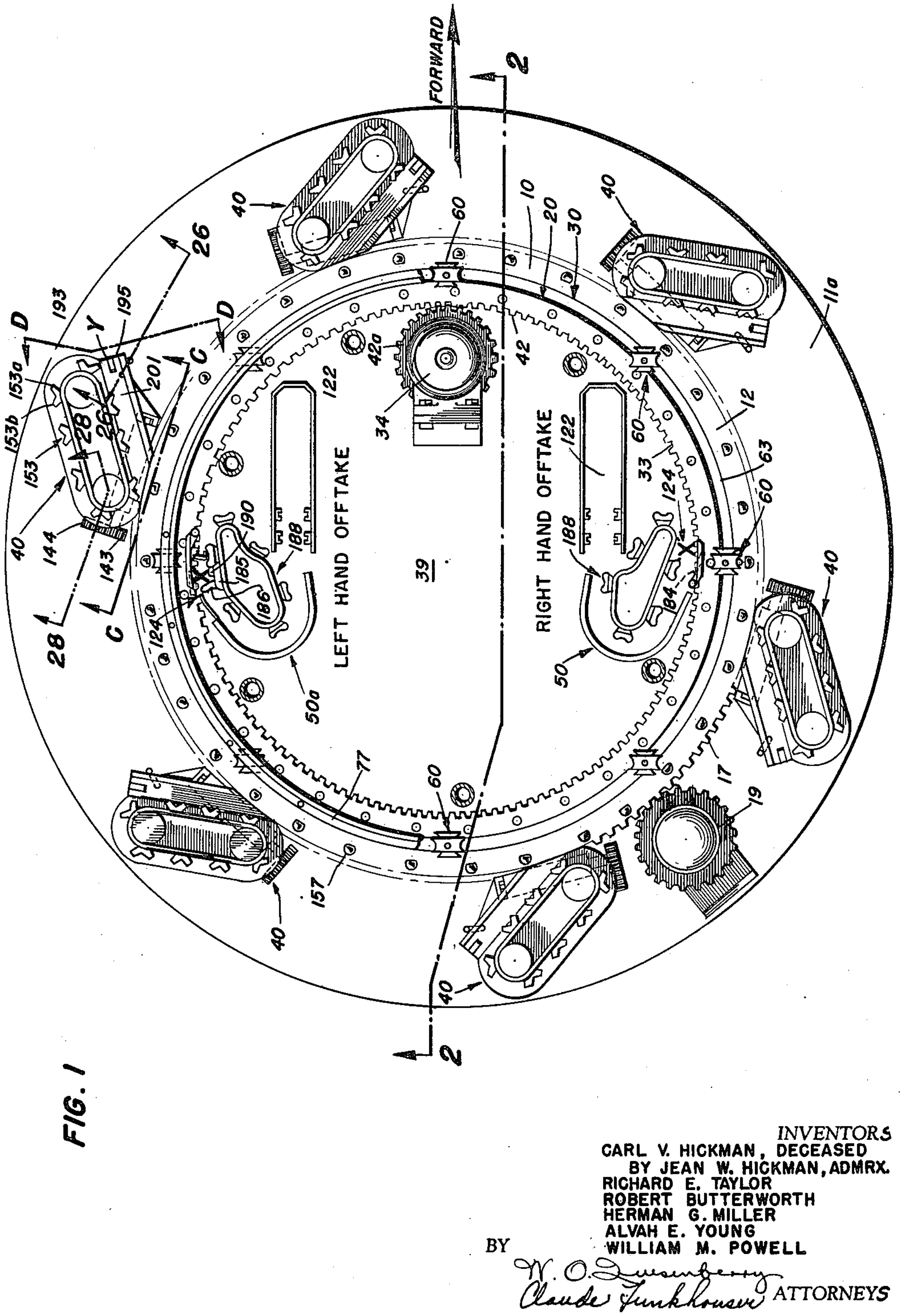
FIG. 1 is a diagrammatic plan view of the ammunition transfer mechanism.
Figures 3, 6, 7:
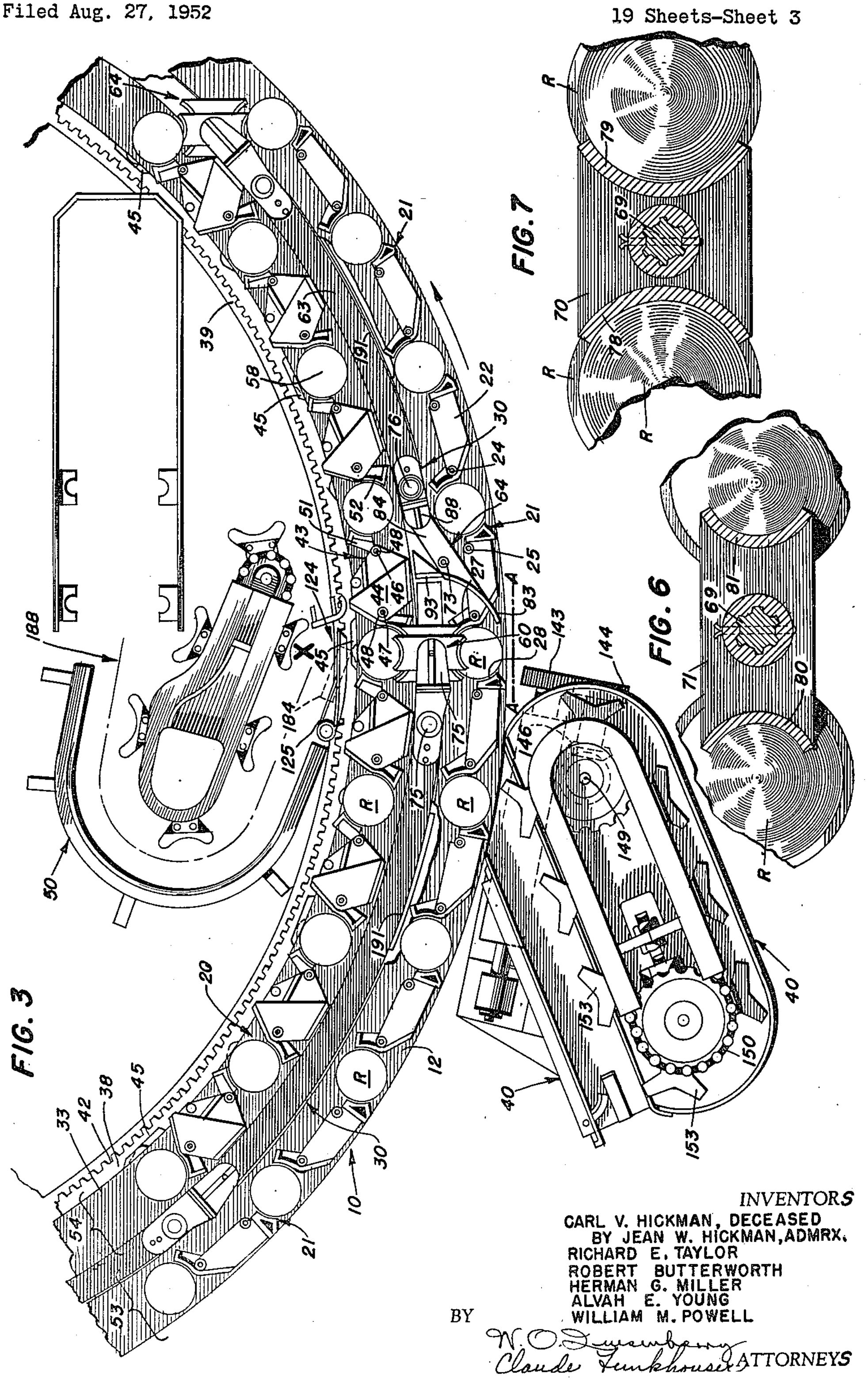
FIG. 3 is a detail plan view of the lower segment of FIG. 1, the middle ring angle frame being omitted.
Figure 4:
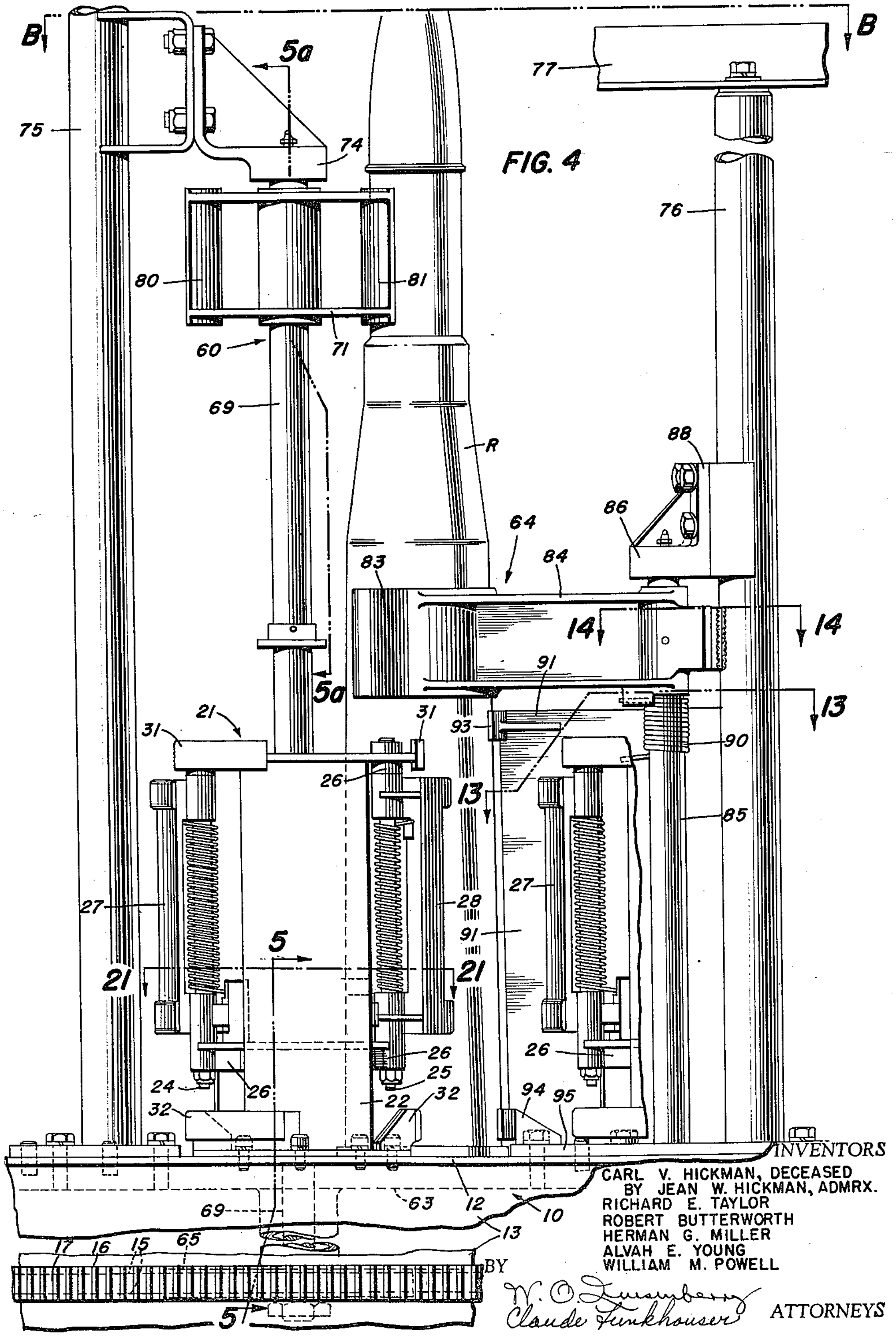
FIG. 4 is a side elevation of one of the outer ring shutter assemblies, a middle ring shuttle assembly and a transfer mechanism, substantially as viewed on the plane A—A of FIG. 3.
Figure 5:
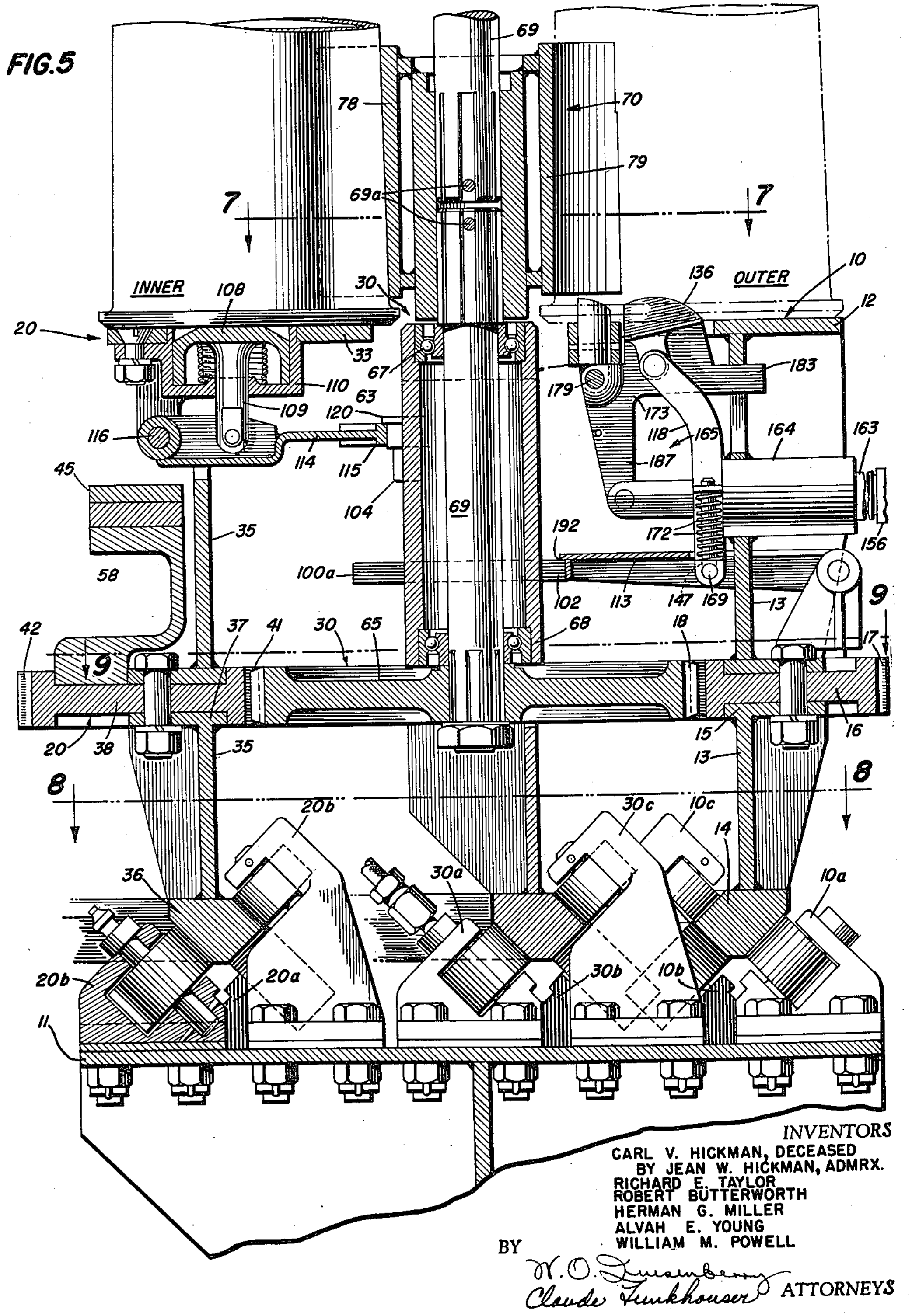
FIG. 5 is a vertical section taken substantially on the line 5—5 of FIG. 4 but extending farther down into the bearing roller structure, the middle ring shuttle assembly being detailed to the exclusion of the outer ring shutter assembly.
Figure 5A:
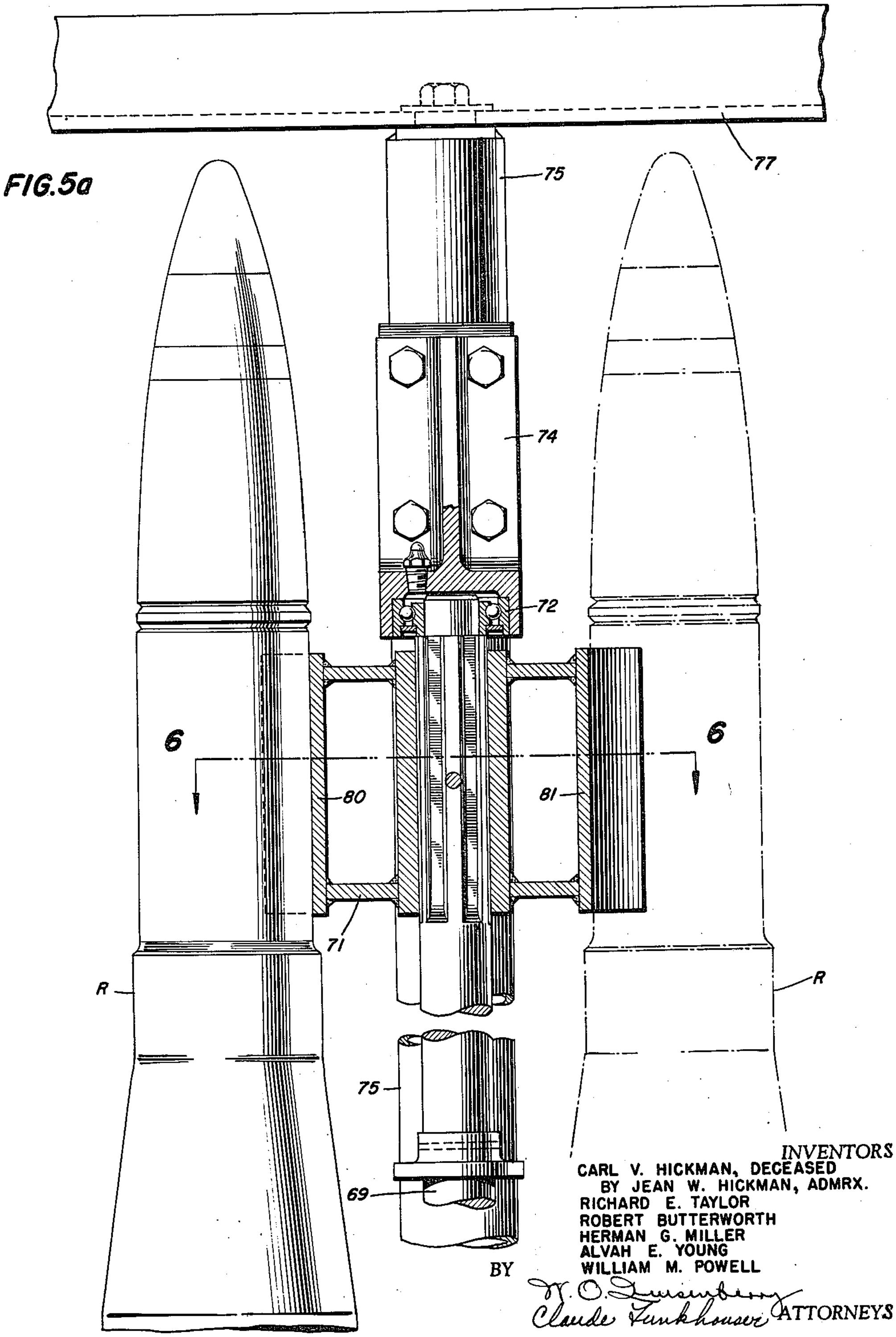
Figure 8:
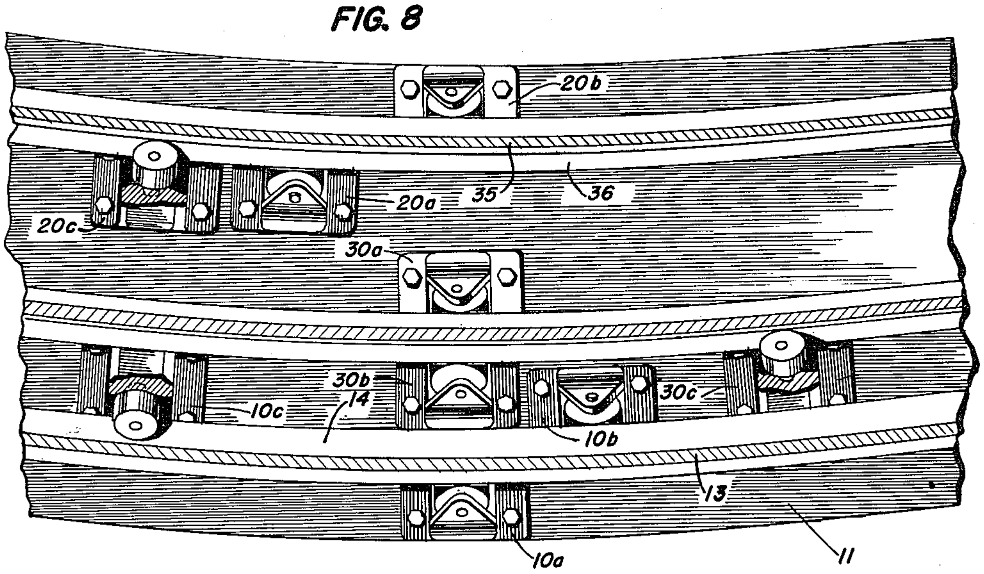
Figure 9:
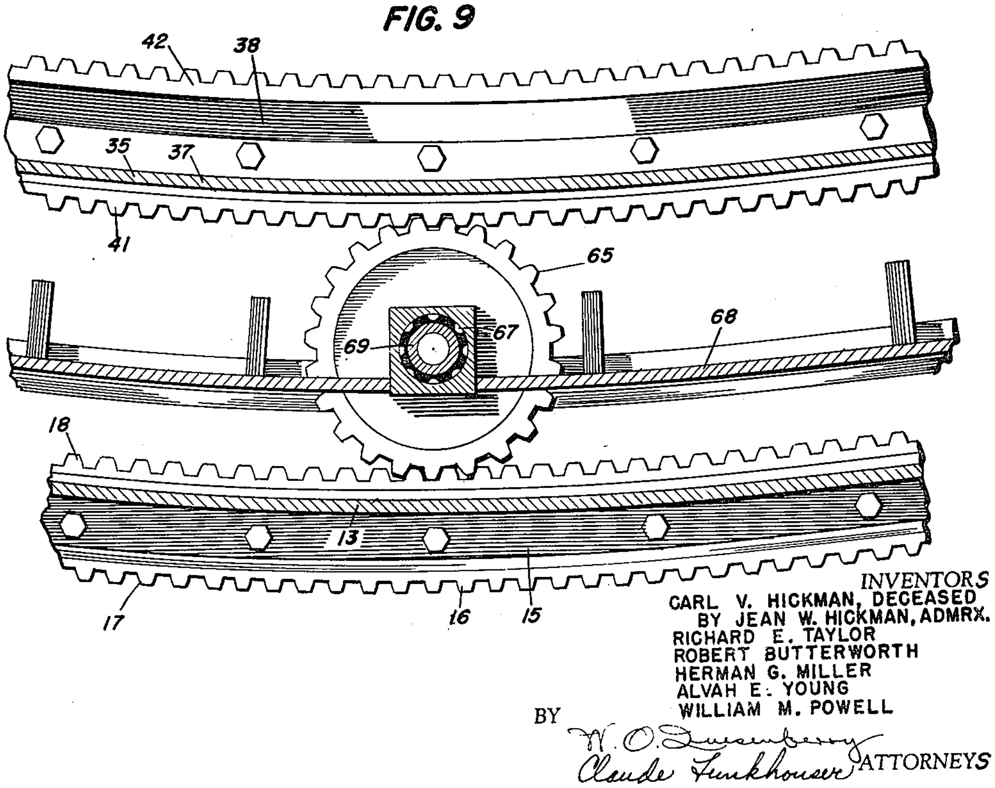
Figure 10:
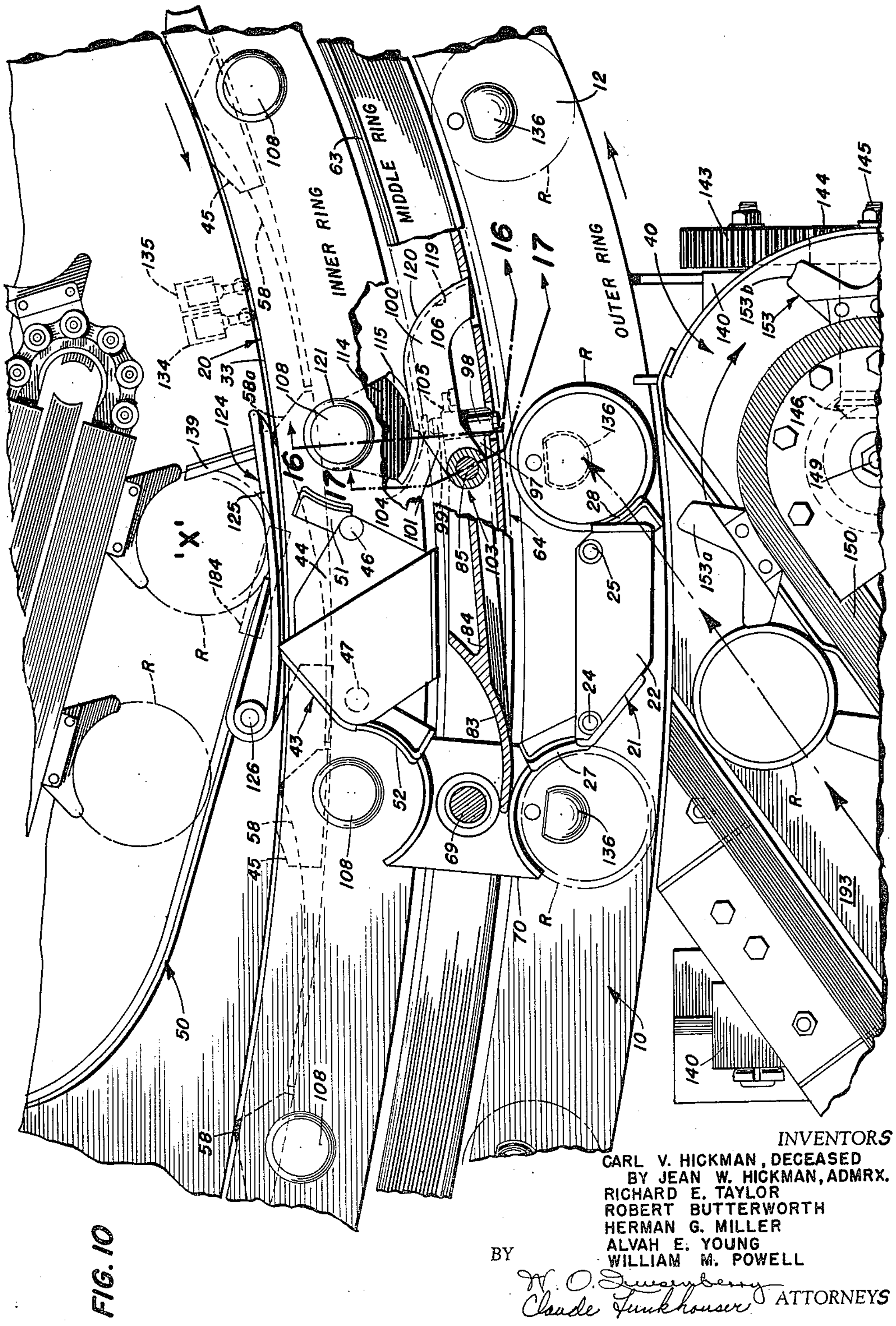
Figures 11, 11A:
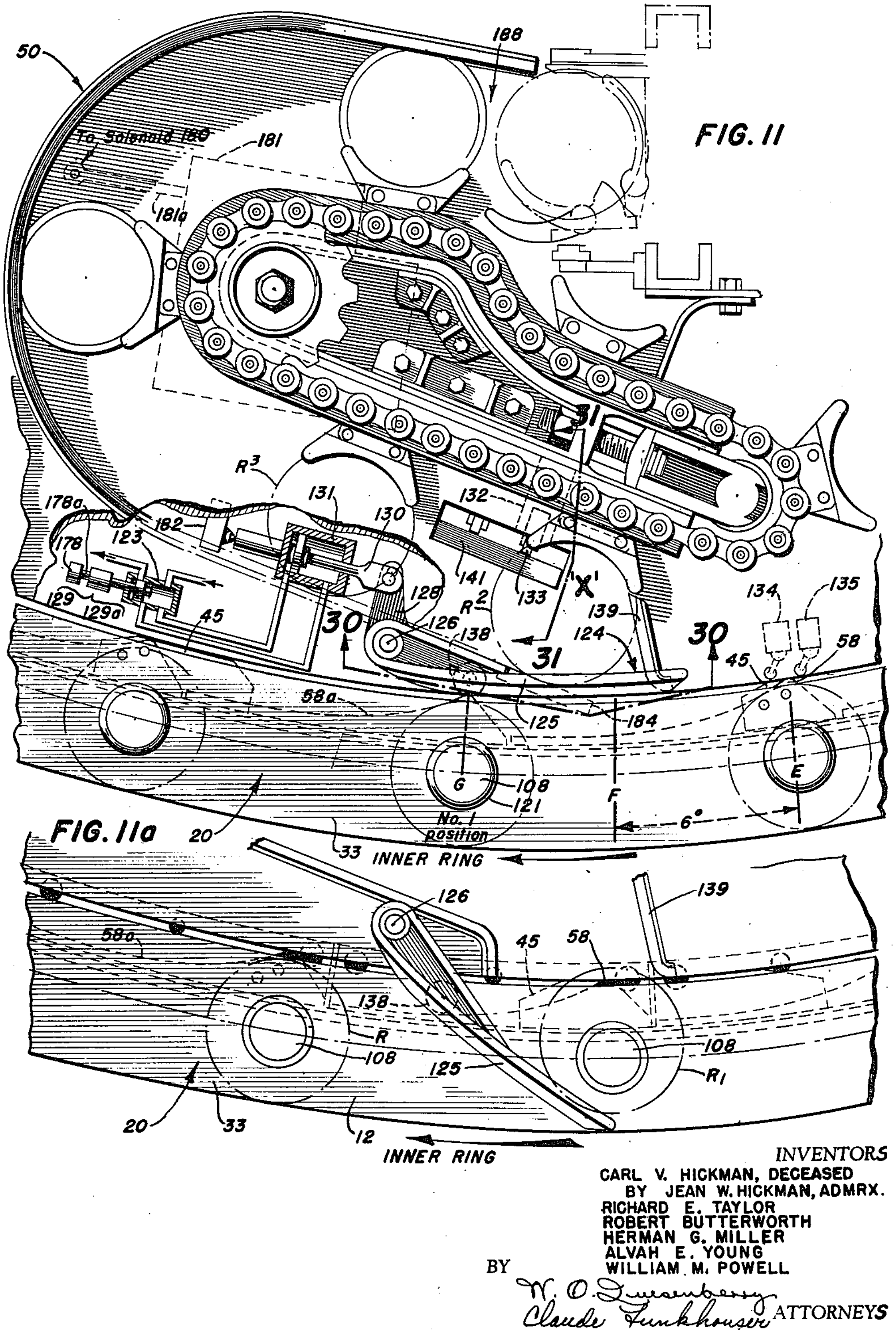
Figures 12, 13, 14, 15:
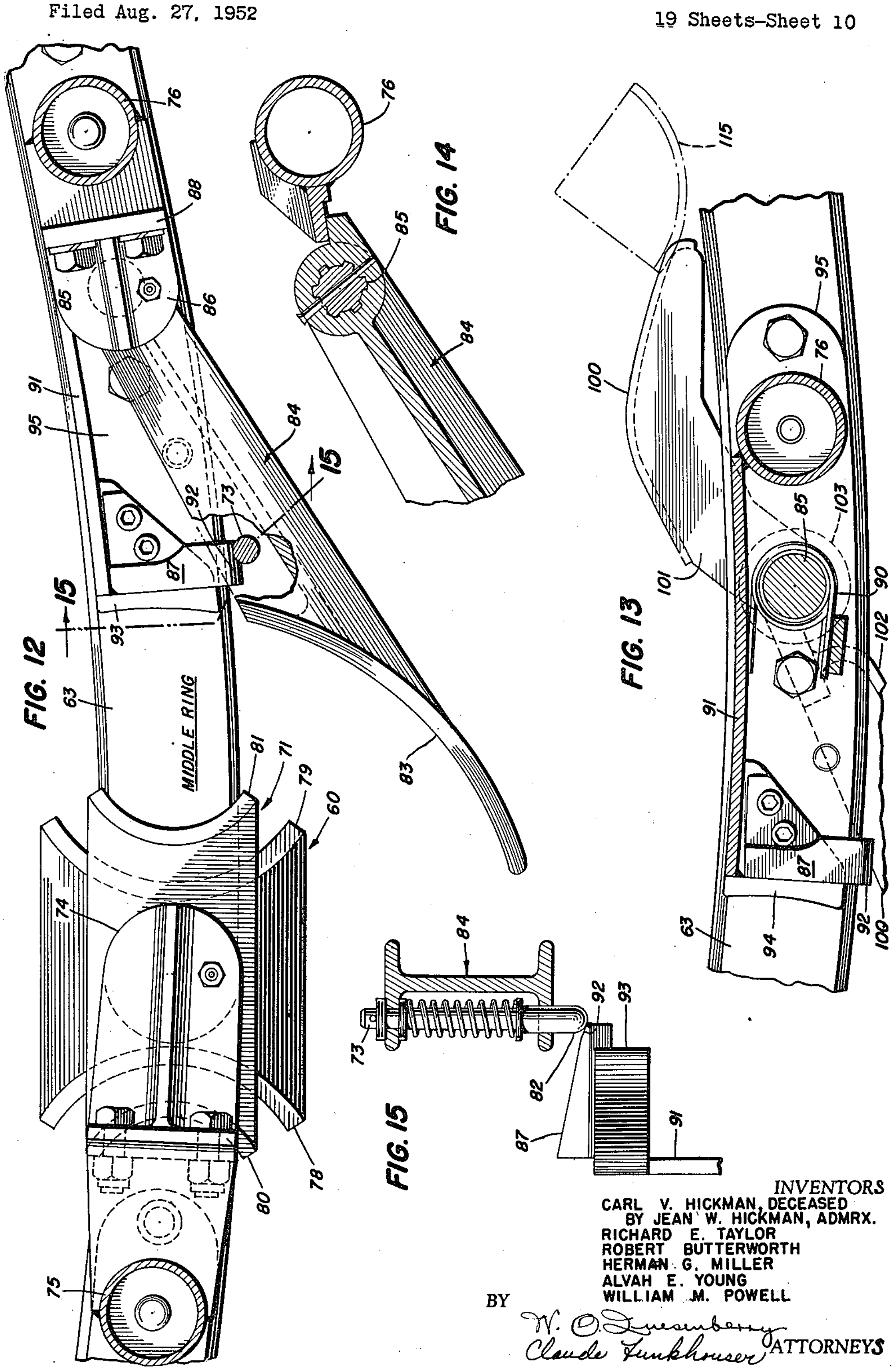
Figures 16, 17:
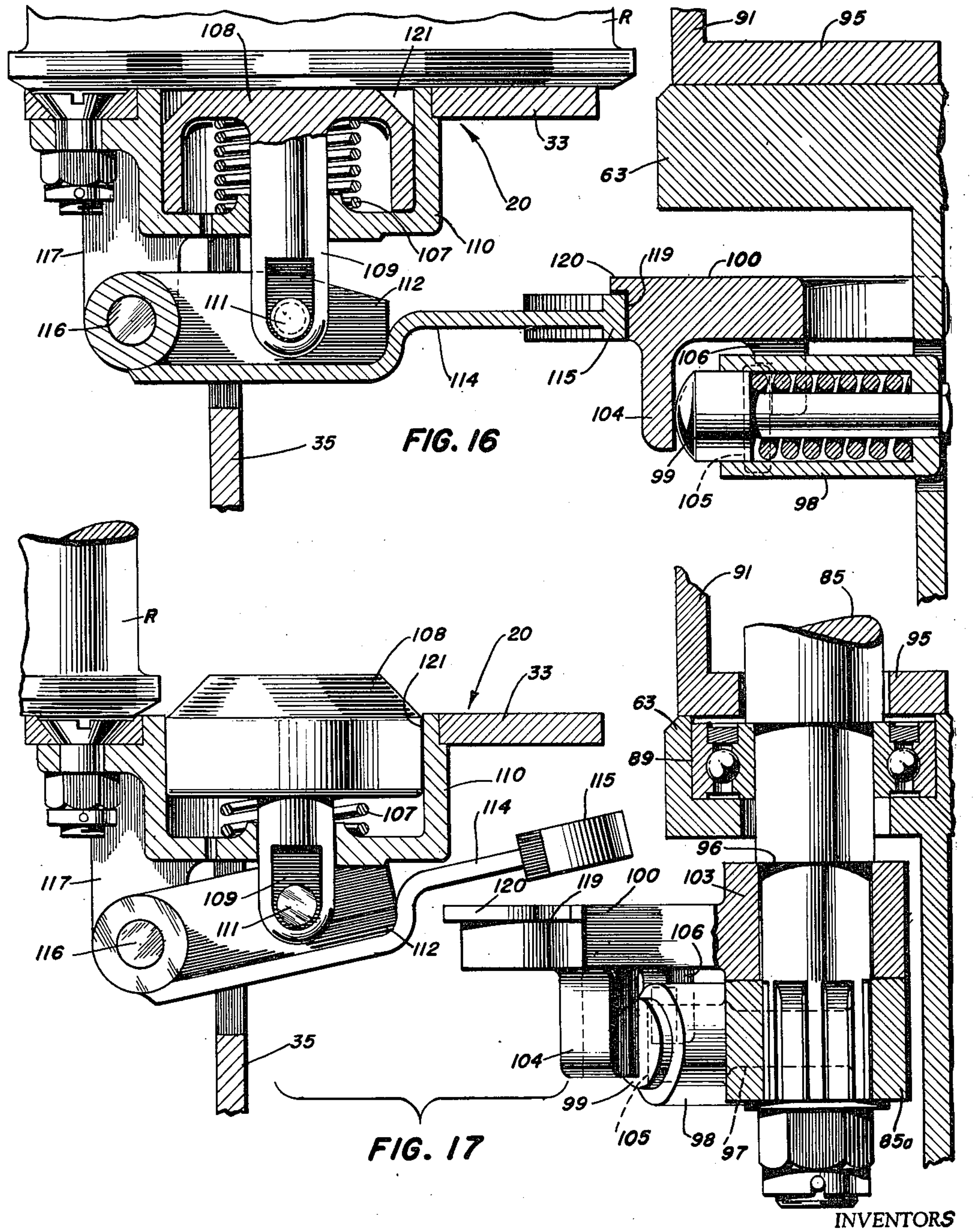
Figures 18, 19:
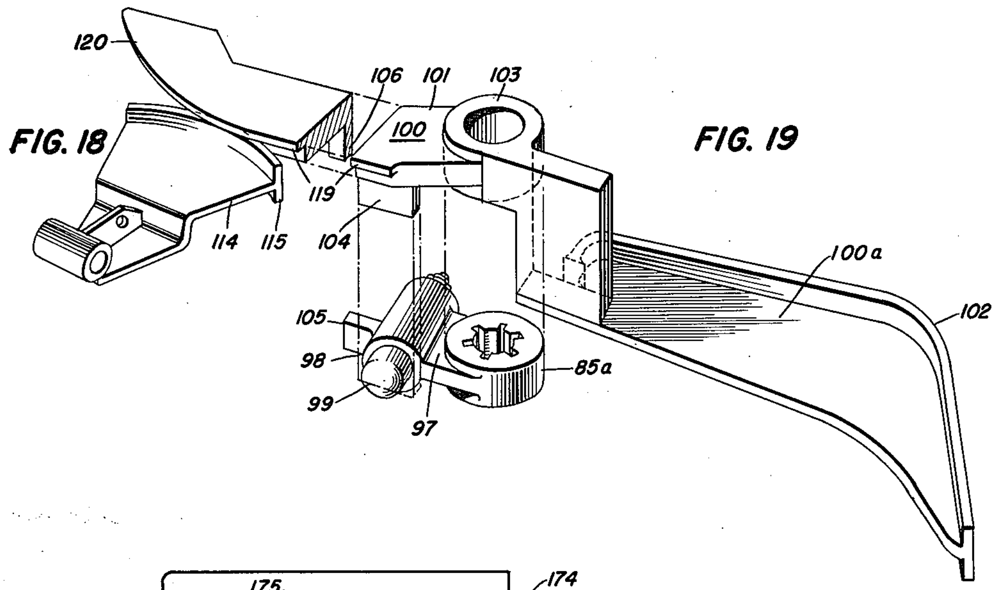
Figure 20:
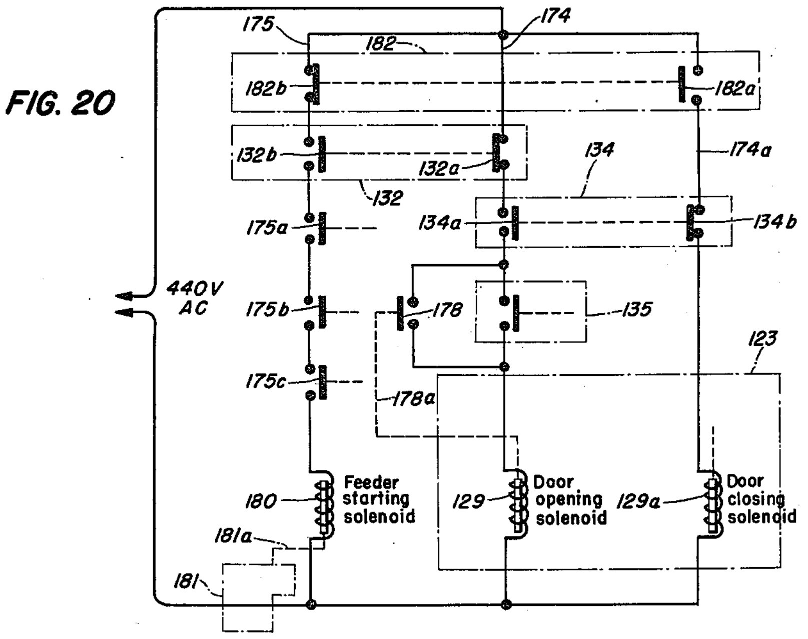
Figure 22:
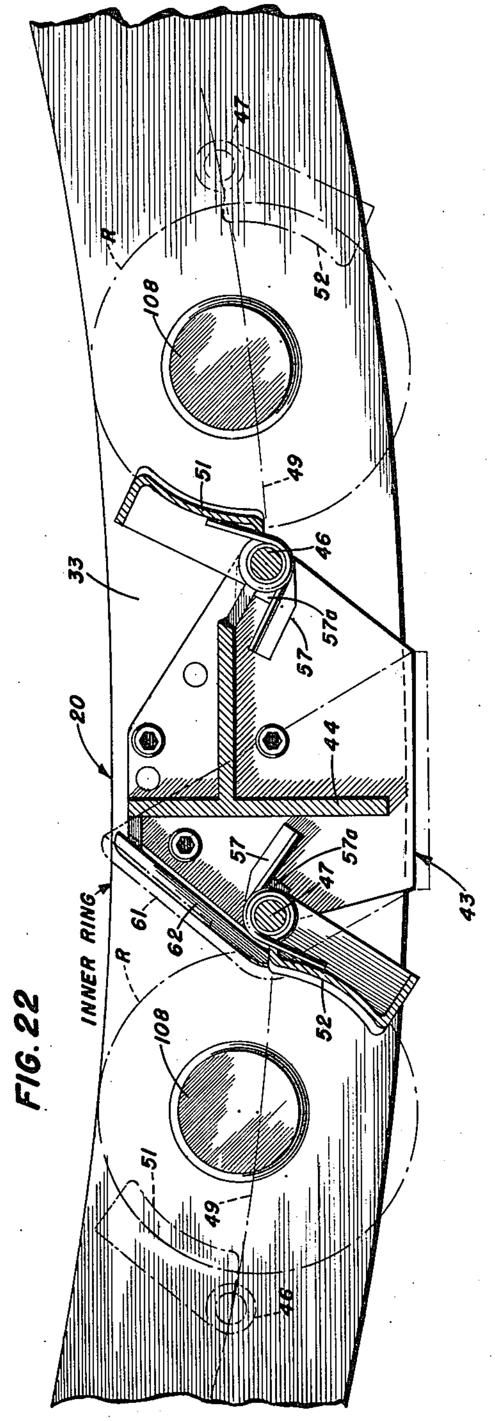
Figure 21:
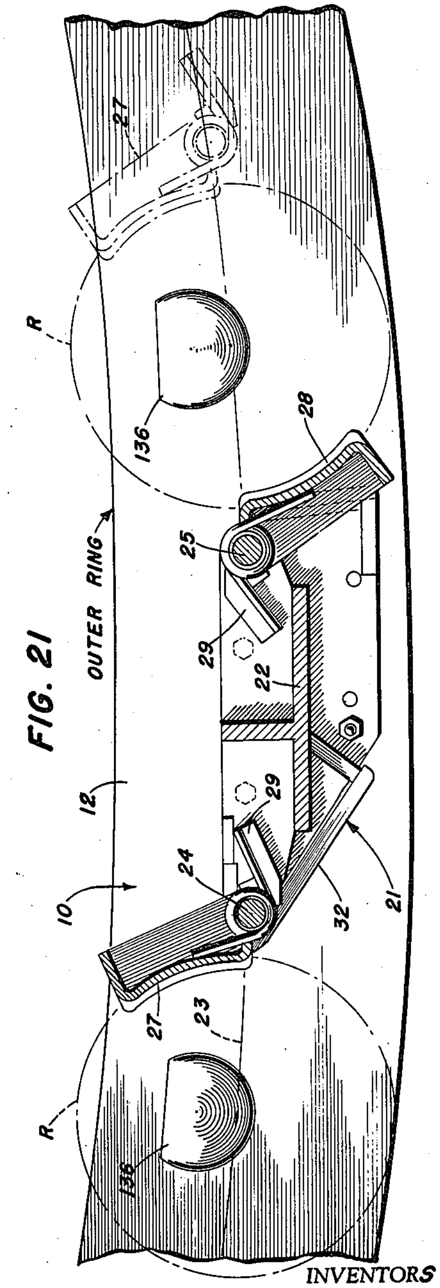
Figures 23, 24:
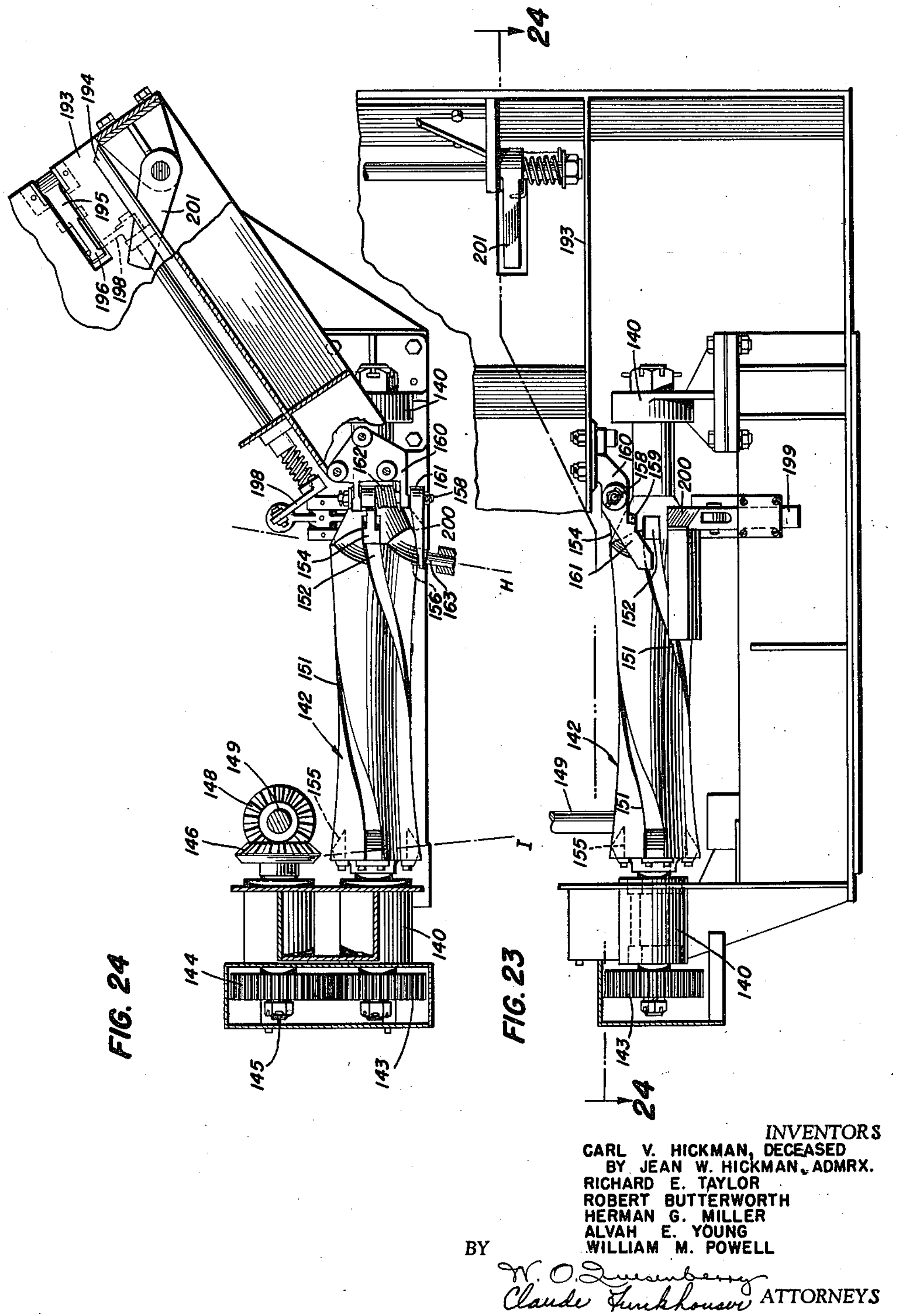
Figure 30:
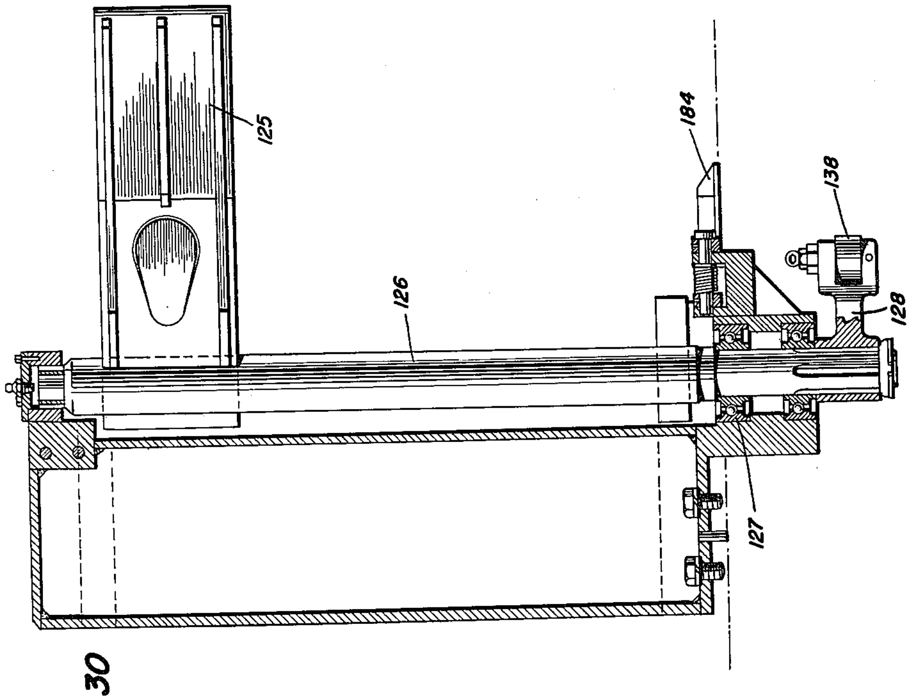
Figure 26:
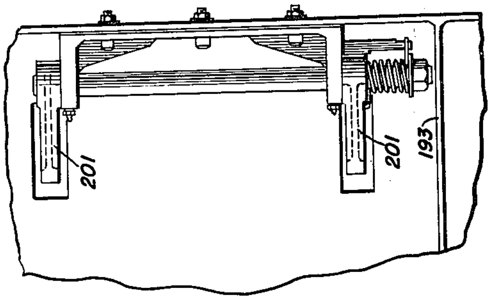
Figure 25:
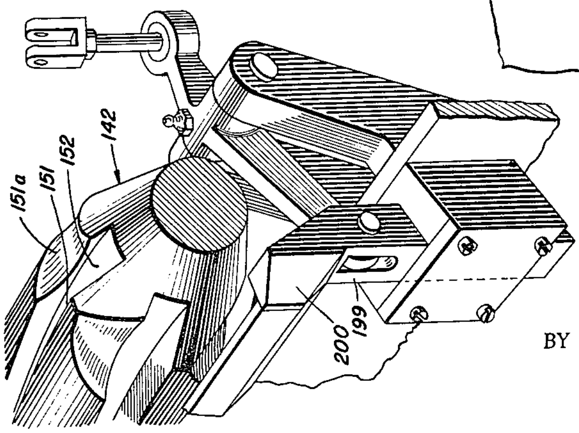
Figure 27:
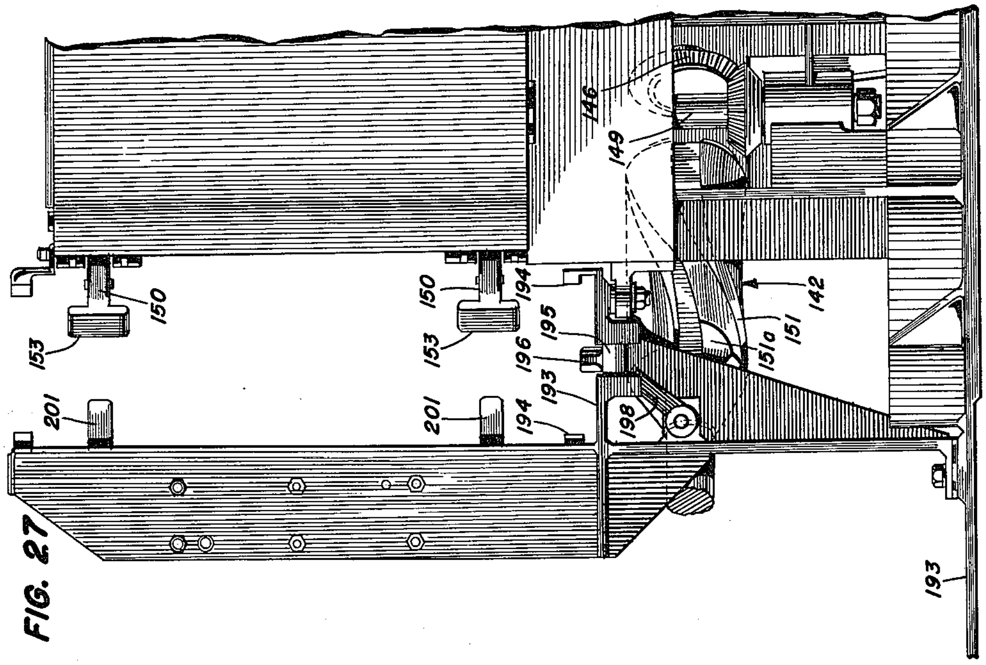
Figure 28:
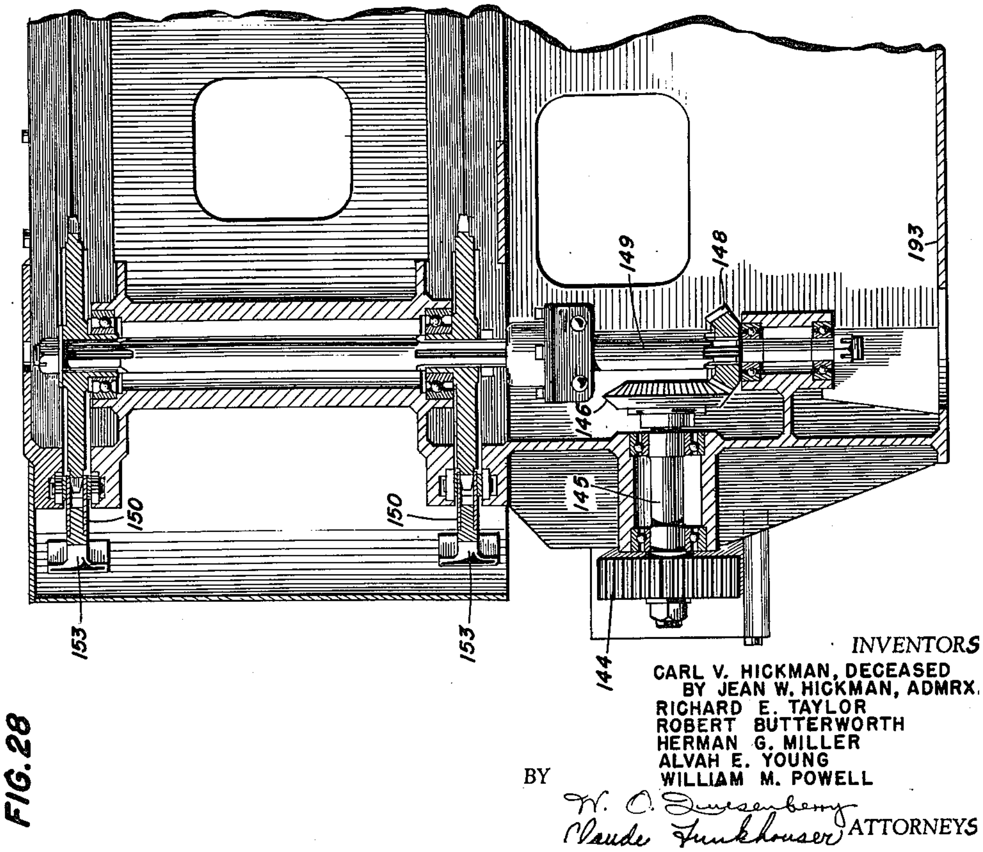
Figure 31:
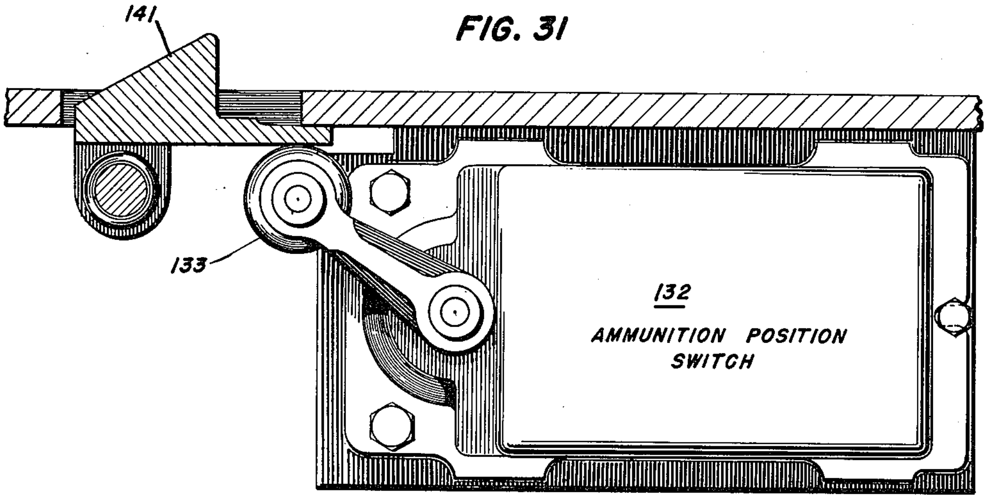
Figure 29:
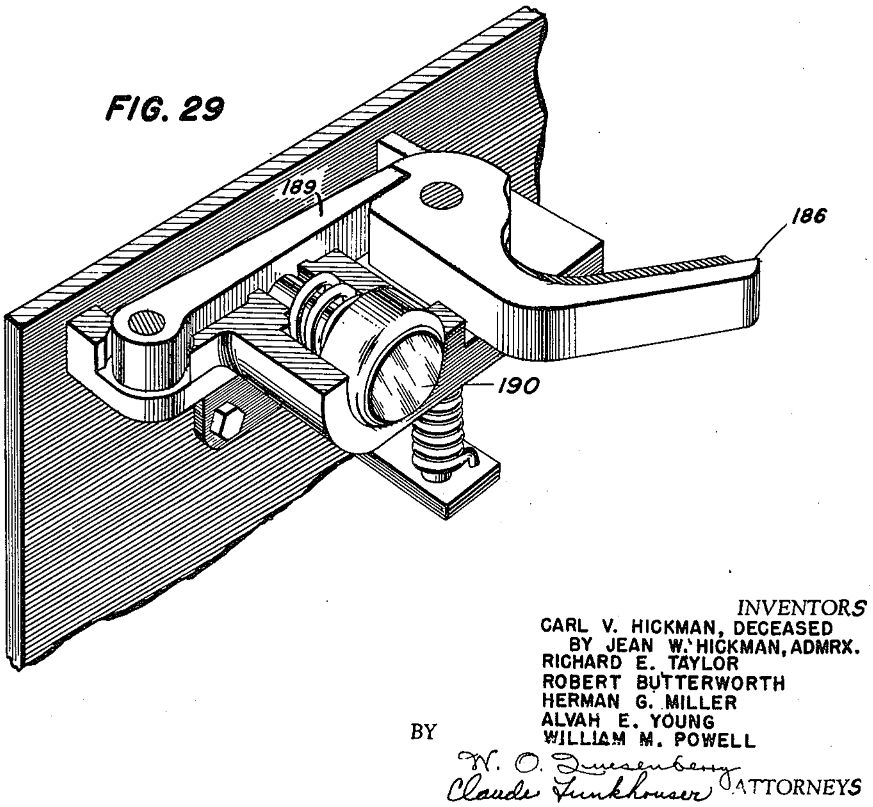
Figure 32:
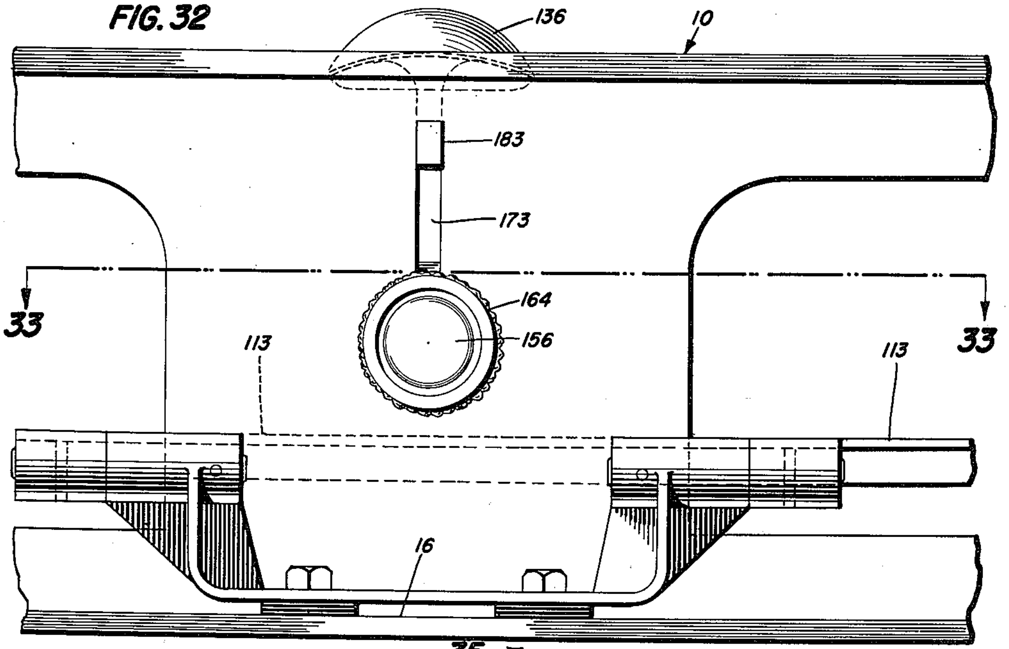
Figure 34:
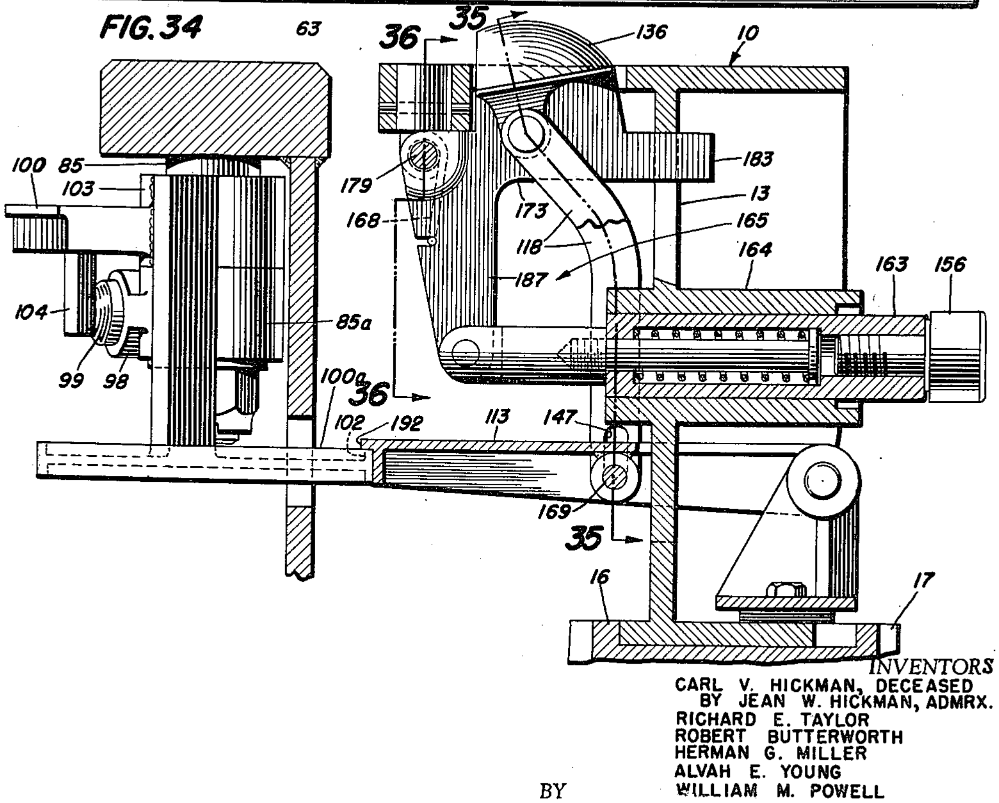
Figures 33, 35, 36:
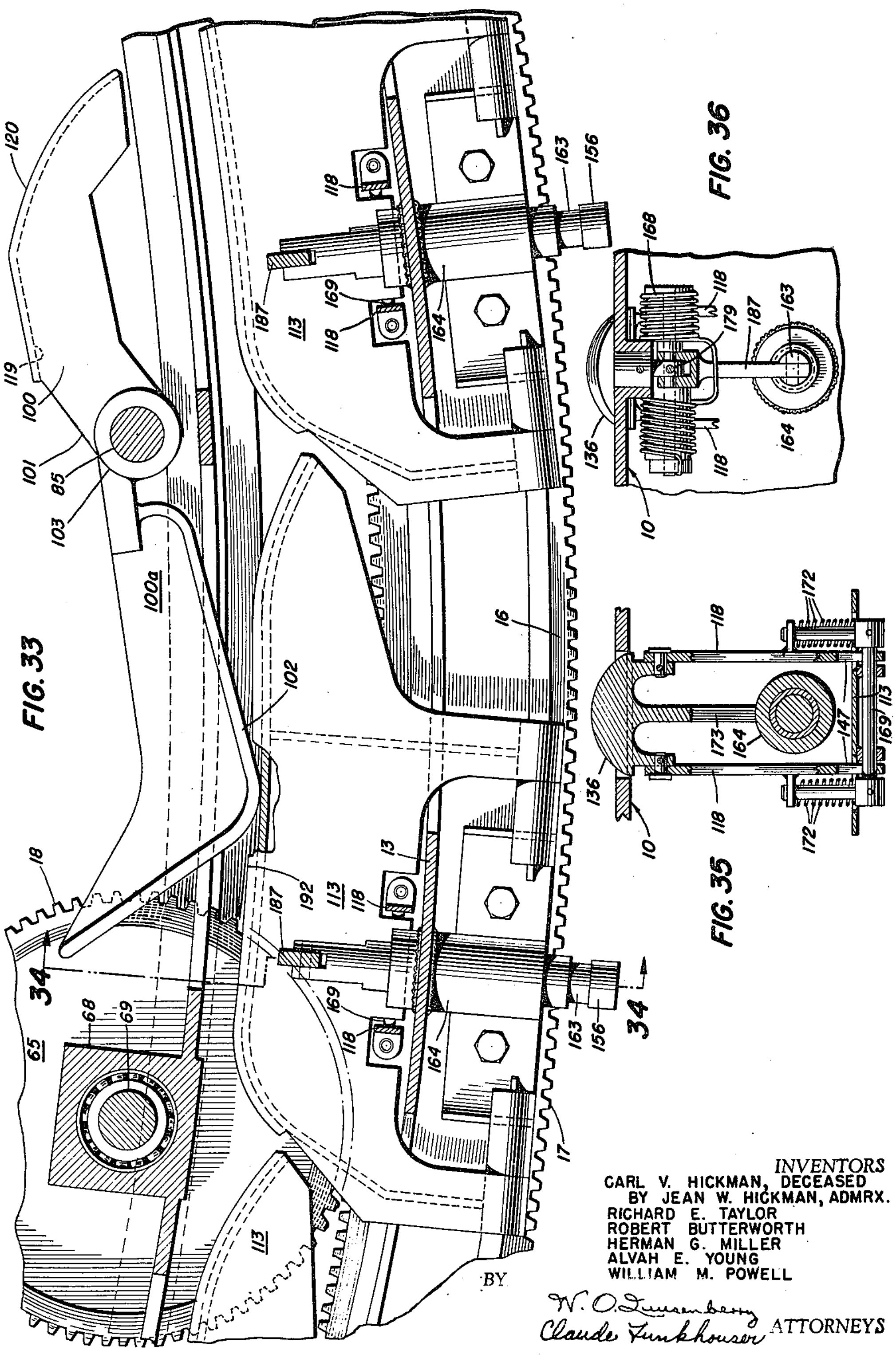

FIG. 5*a* is a vertical section taken substantially on the line 5*a*—5*a* of FIG. 4, readable in upward continuation of FIG. 5 and extending far enough up to include the middle ring angle frame omitted in FIG. 3;

FIG. 6 is a cross section of the upper shuttle taken on the line 6—6 of FIG. 5*a*, the rounds being shown in plan;

FIG. 7 is a cross section of the lower shuttle taken on the line 7—7 of FIG. 5, the rounds again being shown in plan;

FIG. 8 is a cross section taken on the line 8—8 of FIG. 5;

FIG. 9 is a cross section taken on the line 9—9 of FIG. 5;

FIG. 10 is an enlarged view of the central portion of FIG. 3, partly in plan and partly in section, illustrating the transfer of a round from one of the external loaders to the ring assembly;

FIG. 11 is an enlarged plan view, parts in section, again of the central portion of FIG. 3, illustrating the transfer of a round from the ring assembly to what is known as the right hand offtake;

FIG. 11*a* is a detail view following FIG. 11, showing the transfer door in open position;

FIG. 12 is a plan view of some of the middle ring structure as seen on the plane B—B of FIG. 4, parts being shown in section;

FIG. 13 is a section taken on the line 13—13 of FIG. 4;

FIG. 14 is a section taken on the line 14—14 of FIG. 4;

FIG. 15 is a cross section taken substantially on the line 15—15 of FIG. 12, illustrating the transfer cam buffer device;

FIG. 16 is a cross section taken substantially on the line 16—16 of FIG. 10, showing the arcuate cam and control cam respectively of the inner and middle rings in engagement as when a round occupies that particular inner ring position;

FIG. 17 is a cross section taken on the line 17—17 of FIG. 10, being a view similar to FIG. 16 and showing the change in cam positions when the round rides off the spring-loaded plunger of the inner ring;

FIG. 18 is a perspective view of the arcuate cam;

FIG. 19 is a perspective view of a portion of the control cam and the spring-loaded plunger with which it is cooperable;

FIG. 20 is a diagram of the electrical system;

FIG. 21 is a cross section of one of the outer ring shutter assemblies, being taken on the line 21—21 of FIG. 4;

FIG. 22 is a cross section of one of the inner ring shutter assemblies;

FIG. 23 is a side elevation of one of the ring loaders, parts in section, the loader uppermost in FIG. 1 being chosen and viewed on the plane C—C for this illustration because of the convenience of aspect of the parts;

FIG. 24 is a horizontal section taken substantially on the line 24—24 of FIG. 23;

FIG. 25 is a sectional perspective view of a portion of the barrel cam and the associated safety slide;

FIG. 26 is a vertical section taken substantially on the line 26—26 of FIG. 1;

FIG. 27 is an end elevation of the ring loader as seen on the plane D—D of FIG. 1;

FIG. 28 is a vertical section of the ring loader taken substantially on the line 28—28 of FIG.1;

FIG. 29 is a sectional perspective view of the spring-loaded guide of the left hand offtake, together with associated structure;

FIG. 30 is a vertical section taken substantially on the line 30—30 of FIG. 11, showing the transfer door of the right hand offtake and its details;

FIG. 31 is a vertical section taken substantially on the line 31—31 of FIG. 11, showing the ammunition position switch of the right hand offtake and the control lever therefor;

FIG. 32 is a detail side elevation of an external portion of the transfer mechanism;

FIG. 33 is a horizontal section taken substantially on the line 33—33 of FIG. 32;

FIG. 34 is a vertical section taken on the line 34—34 of FIG. 33;

FIG. 35 is a vertical section taken on the line 35—35 of FIG. 34; and

FIG. 36 is a detail vertical section taken on the line 36—36 of FIG. 34.

In carrying out the invention, provision is made of the following principal parts: the outer conveyor or ring assembly 10, the inner conveyor or ring assembly 20, the middle conveyor or planetary ring assembly 30, the peripherally or externally located loading assemblies 40 (of which there are six identical ones), the internally located offtake or ammunition hoist-feeder assemblies 50, **50*a* (of which the respective right and left hand ones are almost identical) and the shuttle assemblies 60 (of which there are eight identical ones). The offtakes 50, 50*a***, so called because they receive the rounds of ammunition from the ring structure on the inside of which they are located, are slightly different from each other, but only in a minor degree, to adapt them to respective right and left hand operation as presently brought out.

Figure 2:
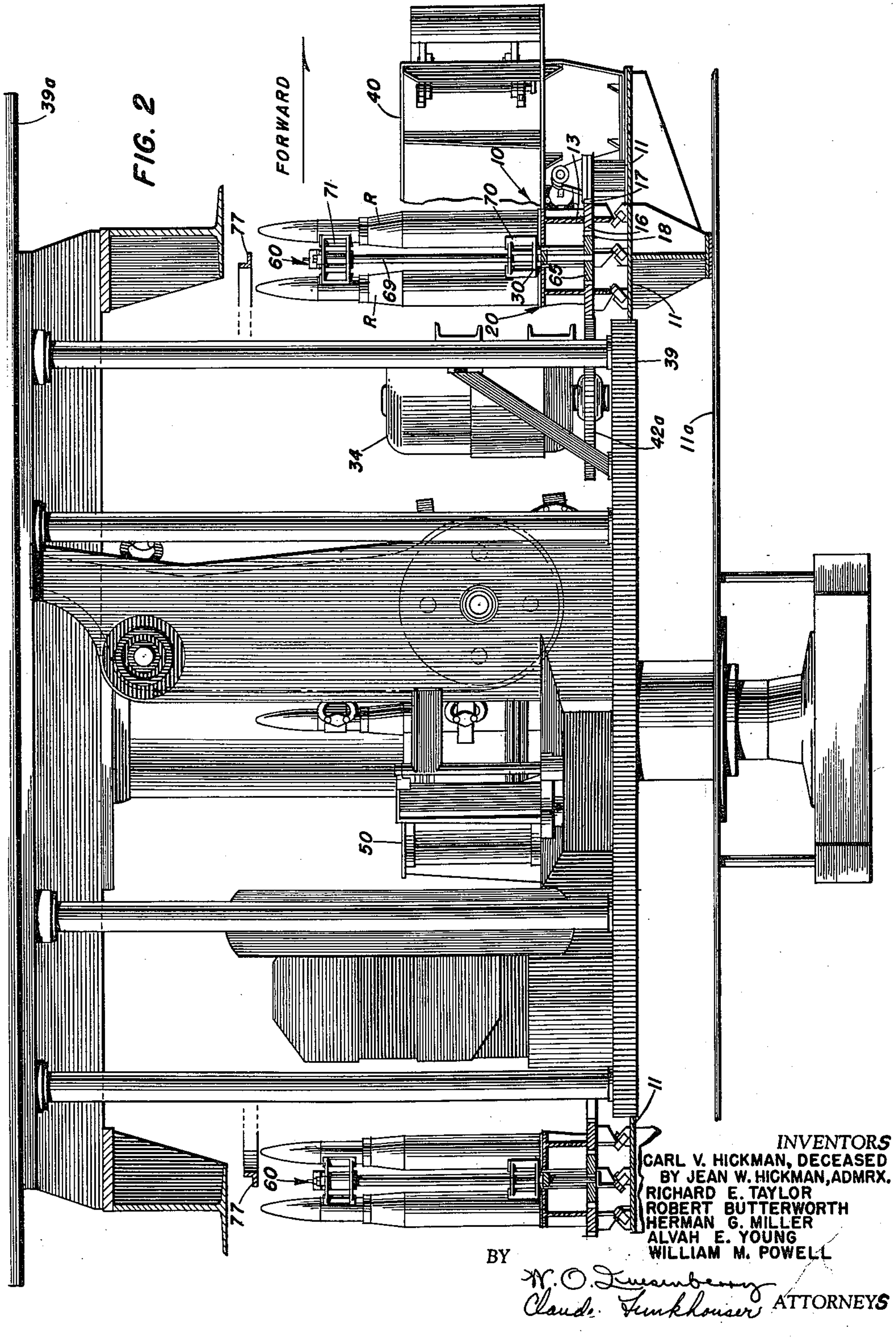
FIG. 2 is a vertical section of the complete structure, as though taken substantially on the line 2—2 of FIG. 1.

The three ring assemblies 10, 20 and 30 are supported on a stand 11 (FIGS. 2 and 5) which, in practice, is adapted to be bolted to any suitable stationary foundation **11*a* (FIG. 2). This stand has secured to it sets of thrust and hold-down brackets: 10*a*, 10*b* and 10*c* for the outer ring assembly (FIGS. 5 and 8); 20*a*, 20*b* and 20*c* for the inner ring assembly and 30*a*, 30*b* and 30*c*** for the middle ring assembly. These brackets revolubly support the bearing rollers shown, and the bearing rollers, in turn, support and restrain the three roller paths referred to below.

Each of the foregoing components, outer ring, inner ring, etc., is described in the order of its original naming, and to that end attention is first directed to the outer ring assembly 10. As shown in FIGS. 1 and 5, this assembly has what is variously called the outer ring or circular platform 12. This outer ring is supported by a circular web 13 which at its bottom has a circular, angularly formed roller path 14, one of the roller paths mentioned above.

The circular web 13 is actually composed of sections having confronting flanges 15 between which is bolted the outer ring gear 16. This gear has external and internal tooth courses 17, 18 (FIG. 9). The external tooth course 17 is the member through which the outer ring assembly 10 is driven continuously and counterclockwise at a predetermined and fixed speed from a power source 19 (FIG. 1) located on any suitable foundation, for example, the stationary foundation **11*a*** (FIG. 2).

Equally spaced along the outer ring 12 is a plurality of shutter assemblies generally designated 21 (FIGS. 3, 4 and 10), the spacing for thirty-four of the assemblies being illustrated in this disclosure. These assemblies are for the purpose of retaining individual rounds R of ammunition in the desired positions, upstanding on their base flanges, circumferentially of the outer ring 12 (FIGS. 4 and 5).

Each shutter assembly 21, momentarily confining the description to one (FIG. 4), consists of a bracket 22 which is rigidly secured to the outer ring 12 (FIGS. 3, 10 and 21). Shafts 24 and 25, vertically supported by bosses 26 on the bracket 22, carry inner and outer spring-loaded shutters 27, 28, being so differentiated because of their orientation (FIG. 21) in respect to the circular center line 23 on which the rounds stand.

These shutters, parts of the assembly 21, are intended to permit entry of a round of ammunition from an adjacent loader 40, for retention in the standing position on the outer ring 12. They also permit egress of the round from the outer ring 12 to one of the shuttle assemblies 60 at the required period. Said shutters 27, 28 are limited as to their movement toward each other by lugs 29 (FIG. 21) which, under the spring loading of the shutters, strike an adjacent part of the bracket 22 and thus leave an opening for the round. Upper guides 31 (FIG. 4) and lower guides 32 (FIGS. 4 and 21) are provided to aid the entrance of the rounds into the standing positions on the outer ring.

Reference is next made to the inner ring assembly 20 (FIGS. 1, 3 and 5). It is observed that, like the outer ring assembly 10, the inner ring assembly has a circular platform here designated 33. Said platform or inner ring is supported by a circular web 35 which at its bottom has an angularly formed roller path 36 (FIG. 5), the second of the three. The two sections of which the web 35 is composed has confronting flanges 37 between which is bolted the inner ring gear 38 (FIG. 9). This gear has external and internal tooth courses 41, 42. In mesh with the internal tooth course 42 is the drive gear **42*a* of a power source 34** (FIGS. 1 and 2).

This power source is mounted on a platform 39 (FIG. 2) which depends from what is herein identified as a trainable mount **39*a*. The guns (not shown), the offtakes 50, 50*a* and the ammunition hoists which the offtakes feed so as to supply the guns, are carried by the platform 39 in common with the power source 34** by suspension columns intervening between the trainable mount 39*a* and the platform 39.

Said power source 34 drives the inner ring assembly 20 continuously and at a uniform speed in the clockwise direction relative to the platform 39 and trainable mount 39*a*. This mount is under remote director control, and is capable of variable rates of train in either clockwise or counterclockwise directions.

Thus far it should be apparent that the outer and inner ring assemblies 10, 20 are individual units, capable of revolving independently and in a common plane. Neither ring assembly ever changes its direction or rate of rotation relative to its respective power source; the outer ring assembly rotates counterclockwise constantly while the mechanism is in operation, at a uniform and fixed rate of speed, as has been stated. The inner ring assembly rotates clockwise relative to the platform and mount 39, 39*a* at a uniform speed, also as has been stated. Bear in mind that the power source 19 of the outer ring assembly is relatively stationary, due to its being carried by the foundation 11*a*. On the other hand, the power source 34 of the inner ring assembly is relatively movable, due to its being carried by the trainable platform and mount 39, 39*a*.

Reverting to the description of the inner ring assembly 20, the inner ring 33 also carries a plurality of shutter assemblies generally designated 43 (FIGS. 3 and 22). There are thirty of these in the instant disclosure. Each inner ring shutter assembly is substantially like any outer ring shutter assembly and, briefly described, consists of a bracket 44 (FIG. 22) which is rigidly secured to the inner ring 33. Shafts 46, 47 vertically supported by bosses 48 (FIG. 3) on the bracket 44, pivotally carry inner and outer spring-loaded shutters 51, 52, this differentiation, again, indicating their orientation in respect to the center line 49 (FIG. 22) of the standing rounds R. The purpose of these shutters, as was stated in regard to the outer ring shutters 27, 28, is to properly space the rounds of ammunition and keep them perpendicular to the inner ring 33. Thus it follows that the shutter assemblies of the outer and inner rings segregate the rounds R into two concentric rows bracketed under 53 and 54 in FIG. 3. Said shutter assemblies exercise a firm grip on the rounds, due to their spring loadings.

Still describing the inner ring assembly 20 (FIG. 22), the shutters 51, 52 are limited as to their movement toward each other by lugs 57 which, under the spring loading of the respective shutters, strike an adjacent part 57*a* of the bracket 44. Upper and lower guides 61, 62 are provided to guide the rounds off the inner ring 33 and onto either offtake 50, 50*a*. In actual practice the electrical interlocking circuits of the offtakes are contrived, functionally, to remove ammunition from alternate stations of ring 33, odd numbers going to the offtake 50 and even numbers to the offtake 50*a*.

Toward that end the inner ring ammunition stations will be permitted to rotate a full 360° after the removal of a round before a second round is required from the same ammunition station. The advantage gained by this arrangement is to insure a 360° ring rotation so that the filling of all thirty round stations is assured. The function is accomplished by a switch cam 45, there being fifteen of these cams, each secured to alternate door-closing cams 58, both later described.

The next reference is made to the middle or planetary ring assembly 30 (FIG. 2). This is operatively located between the outer and inner ring assemblies 10, 20 in the common plane of which it lies. The rounds R are slid on their base flanges from one ring to the next, from the outer perimeter across the middle ring to the inner perimeter without being obstructed.

The assembly 30 comprises a ring 63 (FIGS. 3, 5 and 10) which in each of eight equally circumferentially spaced positions carries transfer mechanisms 64 (FIGS. 3 and 4). These mechanisms pick off rounds R from the ring 12 of the outer ring assembly, slide them across the middle ring 63 on an arcuate path and so transfer them onto the ring 33 of the inner ring assembly.

Referring now to one of the transfer mechanisms, noting that all eight are identical, there is a planetary gear 65 (FIG. 5) which is in constant mesh with the confronting tooth courses 18, 41 of the outer and inner ring ring gears 16, 38. The planetary gears operate at the eight, interspacedly fixed positions, and they respond like differential gears to rotations of the outer and inner ring gears.

Such being the case, the middle ring may be found at times to be turning in one direction, in the opposite direction, at variable low or high rates or may be stopped dead as when the inner and outer rings momentarily happen to be running at a specific ratio of speeds. The reason for these maneuvers of the middle ring can be sensed, when it is remembered that the middle ring is driven by its planetary gears which causes a rotary motion of the middle ring imparted by the inner and outer ring gears and a consequent yielding in the ring system when the mount 39*a* responds, as it must, through the entire scale of its rates of train whether in one direction or the other. The middle ring 63 is the yielding element, and its differential action occurs as stated at the beginning of this paragraph.

Bearings 67, 68 (FIG. 5) having their outer races incorporated in the middle ring assembly, revolubly support the lower portion of a two-piece upright shaft 69. The planetary gear 65 is splined to the bottom of this shaft in each of the eight instances. Shuttles 70, 71 (FIGS. 5, 5*a*) are also splined to this shaft, one near the lower end, the other near the upper end. The lower shuttle couples the ends of the two-piece shaft 69 (FIG. 5), pins 69*a* being driven through for a permanent connection.

A third bearing 72 (FIG. 5*a*) supports the shaft at said upper end. Said bearing is bracketed at 74 (FIGS. 4 and 5*a*) to a post 75, this post and another post 76 like it (FIG. 4) being flange and bolt connected at their lower ends to the middle ring 63 in the upstanding positions shown. There is a similar pair of posts in each of the shuttle assemblies. All of these posts are secured at their upper ends to a continuous circular angle frame 77 (partly shown in FIGS. 2, 4 and 5*a*), for the purpose of composing a rigid structure.

Reverting to the shuttles, the lower shuttle 70 revolves in a position immediately above the three rings 12, 33 and 63 (FIG. 5), thus to catch the round near the bottom of the powder case. The upper shuttle 71 (FIG. 5*a*) revolves in a position to catch the round on the body of the projectile (see also FIG. 4). The purpose of the shuttles is to transfer one round at a time at each of the eight shuttle positions from the outer ring 12 across the middle ring 63 to the inner ring 33, doing this on their flanged ends, as has been stated.

The shuttles occupy and remain in identical angular positions in respect to each other. They turn in unison, and no shuttle ever assumes an angular position different from any other. This is due to the permanent intergearing with the tooth courses 18, 41, and their direction of turning will always be counterclockwise.

The lower shuttle 70 is composed of diametrically opposite receivers 78, 79 (FIGS. 5 and 7), concaved to fit the base portion of the cartridge case. The upper shuttle 71 has matching receivers 80, 81 (FIGS. 5*a* and 6) to fit the projectile. The transfer of a round at any shuttle position is initiated and assisted by a transfer cam 83 (FIGS. 3 and 4) which transfer, in turn, depends on the occurrence of a round vacancy on the inner ring 33, as presently appears. In other words, the cam 83 is functionally inactive over the middle ring 63 (FIG. 10) as long as there is no round vacancy on the inner ring.

When an empty ammunition station of the inner ring approaches cam 83, the cam 83 is swung out over the outer ring 12 by a torsion spring 90 to transfer a round to fill the vacancy. The cam 83 is part of an arm 84 (FIG. 10) which, by means of a pin through its hub, is secured near the upper end of the shaft 85 (FIG. 4). The upper end of the shaft 85 rotates in a bearing 86 supported in a bracket 88 secured to the post 76. The lower end of the shaft rotates in a bearing 89 (FIG. 17), mounted in the middle ring 63. The torsion spring 90 (FIG. 4), carried by the shaft 85, has one end secured to the arm 84 and the other end braced against a plate 91 (FIG. 13).

Due to the inherent and necessary rapid motion of the arm 84 and cam 83, the possibility of a rebound is guarded against by the provision of a buffer device at every transfer cam position. A spring-loaded plunger 73 carried by the cam 83 by virtue of being operatively mounted on its arm 84, has an exposed button 82 on the lower end, adapted to ride the incline of a detent cam 87 fixed on the adjacent plate 91. While this cam adds resistance to the inward swinging of the transfer cam 83 it, nevertheless, accomplishes the purpose of checking or buffing the rebound of the transfer cam. The 30° terminus 92 of the detent cam 87, acting against the button 82, absorbs the rebound energy.

The plate 91 is the carrier of a pair of guides 93, 94 (FIG. 4), upper and lower, which stand in continuation of the cam 83 (FIGS. 12 and 13) when occupying its receiving position above the outer ring 12. The plate 91 is welded to the post 76 (FIG. 13) and has a flange 95 (FIGS. 4 and 12) which is bolted to the top of the middle ring 63. Splined to the lower extremity of the shaft 85 is the hub 85*a* of an arm 97 (FIGS. 10 and 17), terminating in a housing 98 (FIGS. 16 and 19) containing a spring-loaded plunger 99. A control cam 100 (FIGS. 10 and 16) has an arm 101, the hub 103 (FIG. 17) of which is rotatable on the shaft 85, being retained in position vertically of the shaft by engagement between the hub of the arm 97 and a step 96 on the shaft.

A lug 104 (FIG. 16) depending from the control cam 100 is under constant pressure of the spring plunger 99 because of its spring loading. The spring loading of the plunger is solely to allow for overtravel of the cam 100 in the clockwise direction. When such overtravel occurs there is a slight and momentary separation of normally engaging lugs 105, 106 (FIG. 10), respectively protruding from the side of the housing 98 and from the underside of the cam 100.

The torsion spring 90 (FIGS. 4 and 13) constantly tends to turn shaft 85 counterclockwise. Thus the arm 84 and transfer cam 83 tend to swing out over the outer ring 12 (FIG. 3) because of being pinned to the shaft. At the same time the control cam 100 tends to swing in under the inner ring 33, all of which is prevented, however, by the presence of a full complement of rounds R on the inner ring 33 or the absence of rounds on the outer ring.

Assume a full complement to exist on both the inner and outer rings. Centered on each of the thirty round positions of the inner ring which can be identified by the confronting shutters 51, 52 (FIG. 3) is a spring-loaded plunger 108 (FIGS. 16 and 17). The round R stands over and upon the plunger and holds it down (FIG. 16). A stem 109 depending from the plunger is guided in a hole in the bottom of the casing 110 in which the plunger rides and which contains the loading spring 107.

A pin 111 makes pivotal connection between the exposed end of the stem 109 and the upstanding web 112 on the plate portion 114 of an arcuate cam 115. This arcuate cam abuts control cam 100 when a round R is on the plunger (FIG. 16), obstructing the control cam from (*a*) moving counterclockwise and (*b*) preventing swinging of the transfer cam 83 to the transferring position, both under pressure of the spring 90.

The plate portion 114 is pivoted at 116 at its end opposite to the arcuate cam 115, to a fork 117 extending down from the underside of the casing 110. A recess (FIG. 16) in the working face of the control cam 100 forms a cam 119 and a flange 120, the latter holding the arcuate and control cams in face contact after the departure of the round from its hold-down position on the plunger 108 until disengaged by normal rotation of the rings.

The restraint of the flange 120 prevents premature functioning of the transfer cam 83 to refill a vacant space on the inner ring 33. At the same time it is necessary to prevent interference between the transfer cam 83 and a round approaching from the nearest loader operating to fill an empty station on the outer ring. In order to refill said vacant space without such interference provision is made of an extension 100*a* of cam 100 (FIG. 33). This extension has a camming surface 102, similar to that of cam 119, which is abuttable with a cam plate 113 to temporarily hold the transfer cam 83 in an out-of-the-way position. The cam plate 113 is one of an annulus of thirty-four of such cam plates, rockably carried by the outer ring 12 (FIGS. 33 and 34).

Straps 118, pendant from the sides of a mushroom button 136 have slots 147 to contain parts of a cross-pin 169 which extend beyond the points of connection with the cam plate 113 to provide mounts for spring couplings 172 to the straps. The mushroom button 136 is the exposed top contour of a web 173 which has a spring-loaded fulcrum connection 179 to and beneath the outer ring. Said button works in and through a hole in the outer ring 12. The web 173 includes a lug 183 (FIG. 34), guided in a slotted portion of the outer ring, and a depending arm 187 to which the inner arm end of a spring-loaded spindle structure 163, part of the cam follower linkage generally designated 165, is pivoted.

Said spindle structure is, actually, two-part, the components being held in normal engagement by an internal spring 168. The outer end of the spindle structure carries a cam follower roller 156 (the outer terminal of the cam follower linkage 165), and said structure is slidable back and forth in a housing 164 protruding radially from the vertical wall portion of the outer ring. The purpose of the spindle structure is to impart the movement of the outer ring 12 to one of the loaders when a round station on the outer ring becomes vacant. The follower roller 156 rides the groove of the barrel cam (later described) to do this. The spring-loaded two-part construction of the spindle structure 163 permits the cam follower roller 156 to remain in said barrel cam groove in case the mushroom button 136 should become depressed by a round prior to the completion of a loading cycle.

Reverting to the cam plate 113, said plate has a flange 192 (FIG. 34) which overrides the camming surface 102 of cam extension 100*a* when the round station of the inner ring 33 adjacent the respective control cam 100 is vacant, and the approaching station on the outer ring 12 is also vacant. This overriding is due to the raising of the cam plate 113 by the previous removal of the round from standing on the mushroom button 136, the action being caused by the torsion spring (FIG. 36) at the fulcrum 179.

The cam action on the extension 100*a*, resulting from the foregoing overriding, rotates the transfer cam 83 (FIG. 3) in the clockwise direction, moving said cam to a safe or said out-of-the-way position inwardly of the outer ring 12, permitting any loader assembly 40 to refill the vacant space in the outer ring without interference from the leading edge of the transfer cam. From this description it can be understood that the foregoing cam action occurs only in the absence of a round from the station on the outer ring adjacent to the cam surface 102.

At this point it is thought well to keep in mind the manner of rotation of the rings. Briefly repeating what has been stated, when the mount 39*a* (FIG. 2) is not in train, the outer and inner rings 12, 33 rotate at their respective constant speeds in their respective directions (FIG. 3), the outer ring counterclockwise, the inner ring clockwise. The outer ring always rotates in that direction at an invariable rate with respect to the deck whether the mount 39*a* is in train or not, and this is easy to understand.

However, the performance of the inner ring seems complex until the action is understood. Although said inner ring always keeps rotating clockwise with respect to the mount, its rate and direction of rotation in respect to the outer ring and to the deck becomes variable when the mount is in train. This is due to the fact that train signals to the mount may call for short or long angular turns of the mount either in one direction or in the other direction. The effect on the middle ring 63 is differential. Although the direction of rotation of the planetary gears 65 (FIGS. 4 and 9) is always counterclockwise (never clockwise), their rates can and will vary as the rate of train of the mount 39*a* varies. Thus it follows that through the planetary gearing the midd'e ring becomes differentially rotative, in one direction or the other direction, at speeds dependent upon the relative speeds of the inner and outer rings.

As the inner ring 33 rotates, considering it to be fully loaded, there will be a periodic release of each control cam 100 (FIG. 10) as the arcuate cam 115 rides off said control cam because of the relative rotations of the inner and middle rings. The control cam then tends to swing inwardly, due to the torsion of the spring 90, but is almost immediately caught by the arcuate cam 115 of the next and advancing round station. There is enough distance between round stations on the inner ring to provide a momentary freeing of the control cam 100 from any arcuate cam 115. Such freeing is necessary to allow any given arcuate cam to swing up in the absence of a round on the respective plunger 108.

Swinging up of the arcuate cam 115 is prevented as long as the flange 120 overlies said cam (FIG. 16). Hence the arcuate cam must pass beyond the heel of the cam 100 so that the arcuate cam can swing up (FIG. 17). The presence of a round on the plunger 108 prevents the arcuate cam from swinging up when said arcuate cam passes beyond the cam 100 as stated.

Assume, however, that an empty occurs in one of the round positions of the inner ring. The plunger 108 in that position will rise, due to its spring loading (FIGS. 5 and 17), as soon as the arcuate cam departs from the respective cam 100. The plunger and the arcuate cam stay up until the next round moves onto the plunger. The freeing of the control cam 100 by the release of flange 120 from arcuate cam 115 allows the transfer cam 83 to swing outward (FIG. 3) to intercept the nearest round riding counterclockwise on the outer ring 12.

As the approaching round R meets the cam 83 it is diverted off the outer ring by action of the cam and is directed into a properly oriented shuttle. The latter, due to its rotation, moves the round against the cam 83, switching it across the middle ring and onto the inner ring. The plunger 108, still up, is depressed by the riding of the base flange of the round against and over the beveled annulus 121 of the plunger.

The annulus goes deep enough down the side of the plunger never to reveal its bottom edge above the top of the ring 33. Therefore, the base flange will be sure to ride the bevel and not meet the obstruction of the cylindrical wall of the plunger. The empty position on the inner ring in that way filled again, said empty having occurred in the first place as the result of removing one of the rounds by means of the nearest feeder or offtake 50, 50*a*.

This offtake, for the moment describing the right hand offtake 50 (right hand of FORWARD, FIG. 1), is so contrived as to keep the space X adjoining its entrance 124 (FIGS. 10 and 11) filled with rounds at a rate which will satisfy the firing rate of the gun. At this entrance there is a transfer door 125, the integral shaft 126 (FIG. 30) of which turns in bearings 127 and has a bellcrank 128 affixed to its lower end. A link 130 (FIG. 11) connects one arm of the bellcrank with the plunger of a hydraulic ram 131 and, when permitted as presently explained, turns the shaft 126 on the outward power stroke of the ram to open the transfer door.

The occurrence of the empty at X causes the transfer door 125 to swing outward over the inner ring to pick off a round much on the order in which the transfer cam 83 picked a round off the outer ring. The foregoing swing of the transfer door is the direct result of the empty at X. If there were no empty at X the transfer door would not swing. This function is controlled by the rounds themselves and by instrumentality of an interlocking switch and cam system.

This system consists of a primary or ammunition position switch 132 (FIGS. 11, 20 and 31) which has a contactor 133 contacting a control lever 141 extending into the X position for a round to stand on. Switch 132 includes contacts 132*a* (FIG. 20) and 132*b*, respectively opened (from the closed position in FIG. 20) and closed (from the open position in FIG. 20) when the lever 141 is weighted down by the round. The respective contacts 132*a*, 132*b* are in the transfer door and offtake circuits 174, 175. Said system also includes a set of two secondary or ring-position switches 134 and 135 (FIG. 11), respectively containing contacts 134*a*, 134*b* and 135 actuated by rollers which engage the previously mentioned switch cams 45 (FIGS. 5 and 11). One switch cam is secured to every alternate door-closing cam 58 (FIG. 3), also previously mentioned. Of the cams 58 there is an annulus of thirty, one for every round position on the inner ring 33.

Continuing with the system, a door-position switch 182 (FIGS. 11 and 20) has contacts 182*a*, 182*b* (FIG. 20), respectively in the door-closing circuit 174*a* and in the offtake circuit 175. The ring-position switch 134 bridges the door-circuit components 174, 174*a* while the ring-position switch 135 is confined to the component 174. A valve block 123 (FIGS. 11 and 20) includes in its mechnism two solenoids 129, 129*a* which are components of the door-control circuits 174, 174*a*. The operation of solenoid 129 mechanically closes a holding switch 178, as by the connection 178*a*.

Referring now to the offtake control circuit 175 (FIG. 20), a solenoid 180 in that circuit controls an offtake hydraulic drive and control unit 181 (FIGS. 11 and 20). Said unit is of a known construction, but sufficiently for this understanding is explained as having a valve block containing a valve element capable of operation by the solenoid through a mechanical connection 181*a*. The control unit 181 includes mechanism which is arranged to produce intermittent single step motions of the offtake 50. By means of that mechanism, said offtake will produce one step then stop. It is the energization of the solenoid 180 which activates the unit 181 to produce that and succeeding steps of the offtake, causing the rounds R to advance one step at a time toward the delivery point 183 of the offtake (FIGS. 1, 3 and 11). Connected in series in the feeder circuit 175 (FIG. 20) are the offtake latch-switch 175*a*, hoist-empty switch 175*b* and hoist-latched switch 175*c*. These switches prevent premature operation of the offtake drive as presently appears.

The description still deals with the occurrence of an empty at X in the offtake 50 and has, largely, been a general account. Certain details are now brought in to make this description complete. The function of the fifteen switch cams 45, each and every one of them, is to (a) close switch 135 and (b) operate switch 134 (FIGS. 11 and 20). This sequence pertains to each cam 45 as it comes within range of the offtake.

The operation of switch 134 closes contacts 134a. Contacts 132a stand closed. The resulting closure of door circuit 174 momentarily energizes solenoid 129, and that through its connection 178a actuates switch 178 to close the by-pass circuit for switch 135, which is immediately opened by its switch lever passing off cam 45 after contact 134a is closed. The solenoid plunger is coupled to the valve 123 as seen in FIG. 11, and there is a consequent operation of that valve.

When the valve 123 is operated, as stated, the ram cylinder 131 is hydraulically operated to impart a clockwise turn to the shaft 126 with a consequent opening of the transfer door 125. At this particular instant a roller 138 carried by the other arm of the bellcrank 128 is at the crest of the preceding cam 58a (FIG. 11), so identified because it precedes the cam 45 which did the switch 134, 135 actuating. Said transfer door opening is permitted by the advance of the steep face of the cam 58a sufficiently far and under the roller 138, because of the clockwise turning of the inner ring 33, to allow the roller to ride until it reaches the low part of the approaching cam 58.

The peaks or crests of all of the cams 58 are radially in line with the round stations on the inner ring. As the door 125 is opening, switch 182 in the way of it, is operated, closing contacts 182a in the door-closing circuit 174a. By now the transfer door is fully open (FIG. 11a).

Continuing to trace switch cam 45, assume that it has advanced 6° from stage E to stage F (FIG. 11). Here the switch 134 is spring-operated as the switch lever passes off the cam 45, opening contacts 134a and closing contacts 134b, thereby opening the circuit 174 to solenoid 129 and completing circuit 174a to solenoid 129a which repositions valve 123 to operate hydraulic ram 131, thereby begin counterclockwise or closing motion of the transfer door 125.

By this time the cam 58 (stage E, FIG. 11) has reached stage G, assuming the previously mentioned 58a position. The roller 138 has ridden up the long slope of the cam thereby positively closing the transfer door and transferring the intercepted round $R^1$ (FIG. 11a) from the inner ring to $R^2$ at the X position of the offtake 50 (FIG. 11). Thus the space X is no longer empty, and the foregoing diversion of the round was aided by a guide 139, fixed to the offtake structure.

As the door 125 closes in the preceding description, the switch 182 is again operated to open contacts 182a in circuit 174a and close contacts 182b in circuit 175. The opening of contacts 182a breaks circuit 174a, deenergizing solenoid 129a for the purpose of preventing needless reenergization of the solenoid 129a when the offtake is not required to operate.

The occupancy of the X position by the round ($R^2$ in FIG. 11) opens contacts 132a and closes contacts 132b (FIG. 20) with a resulting energization of solenoid 180. This energization shifts the previously mentioned but unshown valve element of the unit 181 and causes the offtake 50 to take one step to move the round to the $R^3$ position and then stop, ready for the refilling of the empty which has again occurred at X. The contacts 132b remain closed until the round $R^2$ (FIG. 11) has progressed far enough on the offtake to get clear of the opening 124. It is to insure that purpose that the control lever 141 extends into the X position, and being elongated in the path of the round, is depressed by the latter to actuate the switch 132.

The offtake 50 is equipped with a rim guide 184 (FIGS. 11 and 30) at the entrance 124. As shown in FIG. 30, this guide is spring-loaded to return to the position shown after a round enters the X position. In distinction from the offtake 50 the offtake 50a has a stationary guide 185 contacting the projectile end of the round (FIG. 1). The purpose of the guides is to direct the rounds into the passageways of the offtakes 50, 50a.

All of the operation of the immediately preceding description applies identically to the left hand offtake 50a, but as stated above, this offtake embodies minor structural differences, the details of which now follow. In substitution of the guide 139 of the right hand offtake, the left hand offtake 50a employs a spring-loaded guide 186 (FIGS. 1 and 29) which is held in the round-receiving position by a spring-loaded latch 189. This latch is released by engagement of a button 190 by the round R as it enters the $X^1$ position (left offtake 50a), which permits guide 186 to be displaced by the round as it advances toward the next position on that offtake. Thereupon guide 186 springs back to its initial and latched position.

Attention is next directed to the manner of loading the outer ring 12 from the loader 40 (FIG. 1), the description of one of the latter applying to all. The loader 40 (FIG. 3), now speaking of one, is stationary on the mount structure 11 (FIGS. 1 and 2) and stands dormant until actuated by the outer ring assembly 10. The outer ring assembly is the prime and only mover of the loader, and said outer ring assembly does not impart a working impulse to the loader assembly until an empty round position occurs on the outer ring assembly.

Journaled in appropriate bearings such as 140 (FIGS. 23 and 24) are the shaft ends of a barrel cam 142. One of said shaft ends carries a spur gear 143 in permanent mesh with a similar gear 144 on one end of a countershaft 145. A suitable bearing (FIG. 28) supports the countershaft, and a bevel gear 146 on the other end of it meshes with a bevel pinion 148 on the two-part but coupled shaft 149 of the loader assembly. A 90° turn of the barrel cam 142 rotates the shaft 149 an amount great enough to advance the chains 150 (FIG. 3) a distance of nine inches which, in turn, is sufficient to advance all of the rounds contained by the loader one step, thus to place a round in the empty position on the outer ring. The chains have the necessary sprocket and idler support, and flights 153 at intervals to push the rounds R.

Helical grooves 151 (FIGS. 23 and 24) of which there are four, characterize the barrel cam 142 and extend longitudinally thereof. They have a 90° pitch to produce the foregoing 90° or quarter-turn of the barrel cam when actuated by the outer ring through 10° of outer ring travel. The outer ring is thus self-serving, the occurrence of an empty position thereon producing an affixation to the nearest loader, causing it to move into action to supply a replacement round to the outer ring.

One end of the groove 151 is relieved at 151a in the right cone-shaped end of the barrel cam to assure full engagement of a latch 154 (FIG. 24) with the entrance 152 of the groove. The latch 154 pivoted adjacently to that end occupies each entrance 152 in turn to lock the barrel cam after each quarter turn.

At the other or exit end (the left end) each groove has fixed in it a cam block 155 (FIG. 23). The purpose of this block is to radially displace the driver or roller 156 of the previously mentioned cam follower linkage 165 (FIG. 5). It is to be remembered that this linkage is the connection between the mushroom button 136 and the follower roller 156, all carried by the outer ring 12. The roller 156 is adapted to enter and ride the helical groove 151, and the foregoing radial displacement of said roller occurs after it has traversed the length of the respective helical groove to produce the foregoing quarter-turn of the barrel cam 142.

A pin 158 (FIGS. 23 and 24) which forms a pivot for the latch 154 has bearing in a bracket 160, bolted to an immovable part of the loader. The latch is affixed to the pin 158, and when the groove entrance 152 reaches the zenith position the latch drops in. A latch lever 161, affixed near the outer end of the pin 158, guards the entrance of the groove 151 90° removed from the zenith position. A spring 162 with its respective ends abutting a part of the bracket 160 and bearing down on the latch 154 tends to keep the latch 154 in the entrance 152 and the lever 161 in blocking position across the entrance of the preceding groove.

Returning to the cam follower linkage and the mushroom button 136, as long as a round R occupies a given position on the outer ring 12 said button 136 remains depressed by the weight of the round, and the cam roller 156 remains retracted out of range of both the lever 161 and the groove entrance 152 of the barrel cam. Thus, manifestly, ammunition present in any round position will cause that round position to pass the loader 40 and will not induce any response in it.

However, should the round position be empty the button 136 will be extended because of its spring loading at 168 and the lack of weight upon it, above the outer ring 12. The spindle structure 163 will be extended radially outward through the linkage 165 so that the roller 156 moves into line with the groove entrance 152.

Now the roller 156 first rides under and lifts to latch lever 161. Because of the stepped shape (FIG. 23) of the underside of the latch lever, the lifting of latch 154 out of the entrance 152 is deferred until the roller 156 has fully entered the cam groove 151. Having once entered the cam groove 151 the roller is constrained to remain by forces of the spring 168 (FIG. 34) and the downward pressure of the walls of the groove against the perimeter of the roller.

Briefly repeating, it is to be remembered that the projection of the cam follower 156 into the foregoing latch-lifting position signalizes an empty at the nearest round position approaching the loader. But bearing in mind that there are only six loaders to the thirty-four round positions on the outer ring the possibility arises of a loader's not being in precise relation to the empty position to insure the interengagement at the right time of the roller 156 and the barrel cam groove entrance 152.

If the roller should be permitted to project too near to the right end of the barrel cam it might raise the latch 154 and release the barrel cam and still miss entering the cam groove as it should. This would leave the barrel cam free to roll at random and set up an out-of-control condition which, manifestly, is to be avoided. Since the correct operation is based on an unlatching and latching of the barrel cam only while the roller occupies the cam groove, the foregoing false functioning of the roller 156 is avoided by providing the confronting side of the latch lever 161 with a cam face 159 (FIG. 23). If, now, the roller 156 should be projected at the wrong time, it would strike the face 159 and be cammed out of range of the groove entrance.

Going back to the proper entry of the groove by the cam roller, the ensuing 10° of ring travel and a 90° turn of the barrel cam 142 between starting and finishing positions H—I (FIG. 24) produces, through the intergearing between the barrel cam and loader the previously mentioned nine inch movement of the loader. In that distance the replacement round R is propelled into the erstwhile empty position on the outer ring.

The arrival of the roller 156 at the I position (FIG. 24) brings it edge-on against the block 155. Further movement of the outer ring sets up a cam action which discharges the roller at the exit of the cam groove. The timing is such that as the ammunition base flange rides the button 136 (FIG. 34) to depress it the roller rides the cam block 155 to conformably shift the intervening linkage 165. The latch 154 which rode the rim of the barrel cam up to this time, snaps into the next entrance 152 to again lock the barrel cam.

According to the present arrangement, each of the loaders 40 is loaded by hand. One or two men standing at location Y (FIG. 1: only one example) take the rounds R one by one and place them base flange down on the loader platform 193 (FIGS. 1 and 27). Guides 194 (FIG. 27) located an appropriate distance up from the platform 193 override the base flanges and hold the rounds perpendicular to the platform taken over by the flights 153.

Two safety features are embodied in the round entrance. The first is contrived to prevent an ammunition jam while the loader is cycling (the previously mentioned nine inch stroke). Were it not for this feature the operator might succeed in placing a round in the entrance at such time that it would be caught between the leading edge 153*a* (FIG. 1) of an oncoming flight and the outer wall of the loader, thus either crushing the round or causing a personal injury.

To prevent such contingencies use is made of an operating cam 195 (FIGS. 1 and 27) which is pivoted on the underside of the platform 193 and has an upstanding lug 196 with an inclined approach over which the round can ride to depress the operating cam into the platform. Since the base flange rides under the guides 194, the refusal of the operating cam to depress will block the round and put the operator on notice to stand by. The reason why the operating cam may not depress is this: Should the cam follower roller 156 be in the act of initiating a cycling operation of the barrel cam 142 and consequently of the loader 40 (a condition of which the operator could not be aware), that condition would be the wrong time for the operator to insert a round because of the stated possibility of causing a jam.

It is readily seen that with the base flange under the guides 194 and the operating cam 195 locked in its up position on the platform the round would meet increasing resistance if the operator persisted in pushing it in and for that reason the operator would sense that he must wait. The operating cam has a linkage system 198 (FIG. 24), spring-loaded as shown to return it to its initial position, terminating in a safety slide 199 (FIGS. 23 and 25) adjacent to the barrel cam groove 151, said slide having a cam head 200. If roller 156 should be in the foregoing position it would obstruct the slide 199, and through the linkage 198 lock the operating cam 195 in the aforesaid up position.

Should the cam follower roller 156 be projected earlier and in its proper sequence of operation (earlier than the act of initiating the cycling) then the safety slide 199 would be free to rise by the full depression of the operating cam 195 when setting a round upon it. The follower roller 156 would presently engage the cam head 200 and by it be deflected back away from the barrel cam. By the missing of the groove entrance 152 by the cam roller the loader is kept dormant. In this interval the operator has time to push the round over the operating cam and against the trailing edge 153*b* (FIG. 1) of the flight 153 in advance of it.

Now that the new round is properly located, the next projection of a follower roller 156 will be followed through with a proper cycling of the barrel cam and loader 40. The second safety feature, mentioned above, consists of a spring-loaded shutter 201 (FIGS. 1, 23, 24 and 26) which acts as a back-stop for the last round loaded.

The operation of the transfer ring mechanism is summarized as follows. The entire mechanism in FIG. 1 stands poised, so to speak, to come across with a fresh round of ammunition every time a shot is fired by one of the guns (not shown). Until that time the status of the mechanism is this: Each and every one of the external loaders 40 is dormant. The outer ring 12, fully loaded, is in counterclockwise rotation at a uniform and invariable rate of speed. As previously emphasized, it does not stop or change its direction of rotation. The inner ring 33, also fully loaded, is in clockwise rotation relative to the mount 39 at a constant angular speed, invariable in respect to said mount. The middle ring may be stationary or rotating in either direction dependent upon rate and direction of mount train, but the shuttle assemblies 60 carried by the middle ring are turning, all counterclockwise at identical rates, and never changing in angular orientation in respect to each other. Both offtakes 50, 50*a* are dormant.

Suppose now that a shot is fired. The offtake for example, 50, of the respective gun immediately supplies a round of ammunition to the delivery point 188 (FIG. 1), hence a vacancy will occur at X, due to the cycling of the offtake, and this starts the following chair of events.

Contacts 132*a* will close as in FIG. 20, due to the removal of the round from X and the consequent release of the control lever 141. Switches 135 and 134 are closed in that sequence (FIG. 11) by the next advancing switch cam 45. The circuit 174 thus becomes closed (FIG. 20) and the door 125 is swung out over the inner ring 33 (FIG. 11*a*) by the resultant operation of the solenoid 129, valve 123 and ram cylinder 131. Cam 45 presently leaves switch 134, and when it does contacts 134*b* (FIG. 20) are closed, having been opened by the recent encounter of the cam 45 with switch 134. The closure of circuit 174*a*, due to the prior closure of contacts 182*a* by the opening of the door, energizes solenoid 129*a* to begin the door reclosing operation. This is assisted by the door roller 138 in riding up the long slope of the approaching door-closing cam 58. In closing, the door scoops the next round R into the entrance 124, re-establishing the quota of the offtake 50 but leaving the inner ring 33 minus one round.

The plunger 108 being freed by the abstracted round, rises and triggers the operation of the transfer cam 83. The transfer cam 83 constantly tends to swing out over the outer ring 12 but is prevented from doing so by the recurrent engagement of its control cam 100 with the succeeding arcuate cams 115, all of which up to now were down and in position to intercept the control cam. However, when the plunger 108 rises, the respective arcuate cam 115 rises also. This leaves a cavity, so to speak, into which the control cam 100 will swing when it arrives.

In other words, when the empty position of the inner ring 33, here designated the empty No. 1 position (FIG. 11), moves away from the now filled but previously vacant X position of the offtake 50 it passes the nearest approaching transfer mechanism 64. It is the control cam 100 of that mechanism which now becomes effective because of its swinging into the so-called cavity. At the same time the transfer cam 83, momentarily lacking prevention, swings out (FIG. 3) and into the path of a round R on the counterclockwise advancing outer ring 12.

Imagine the empty No. 1 position of the inner ring as advancing past the observer because of its clockwise rotation (FIG. 11). The very next arcuate cam 115 of the inner ring forms an abutment for the control cam 100 of the cognizant transfer mechanism to ride upon. As said control cam rides the abutment it forces the transfer cam 83 in. While this is transpiring the round R in the path of the cam 83 will be retained in the shuttle assembly 60 by the advance of the outer ring upon the transfer cam, and transferred from the outer ring to the inner ring by the counterclockwise rotation of the shuttle assembly.

The round is pushed directly into the waiting shuttle assembly 60. The transfer cam 83 can never miss the shuttle assembly because the two are in a permanently fixed relationship to each other. Every ammunition transfer made by the cam 83 ends at the respective shuttle assembly which then takes over.

Momentarily there is an ammunition vacancy on both the inner and outer rings. By the time the shuttle assembly is ready to disgorge the round R, the empty No. 1 position of the inner ring will have moved into line to receive it. The moment that this occurs, the vacancy on the inner ring is filled. The weight of the round upon the plunger 108 lowers the arcuate cam 115 to its former position. The arcuate cam will not bear down on the control cam 100 because by the time under consideration the arcuate cam and control cam will have separated out of range of each other. The ammunition vacancy on the outer ring still exists.

Such being the case, the cam follower roller 156 of the spindle structure 163 at that position is projected outwardly. The projecting spindle structure is, in effect, an "empty" signal. The cam follower roller 156 being out, will engage the barrel cam 142 of the nearest loader 49 and give it a 90° turn. The reason for having six loaders is to make it unnecessary for the empty station to travel too far before reaching a loader. The idea is to refill the outer ring as soon as possible upon the occurrence of a vacancy.

The 90° turn of the barrel cam 142 advances the chains 150 far enough to push a round out of the loader and onto the ring 12. The chains feed the round onto the outer ring in the general direction of rotation of said ring. The round is pushed in between the waiting shutters 27 and 28 of the assembly 21. When the round arrives it depresses the mushroom button 136 (FIG. 34), tending to retract the spindle structure 163, also when the roller 156 rides up and off of the cam block 155 it tends to retract the button 136. The two work together for a mutual retraction of the button and spindle structure, restoring the immediately concerned mechanism to its status before the vacancy occurred. In these sequences the outer ring 12 never stopped nor altered its pace or direction.

In actual firing the foregoing actions will take place very rapidly. The two offtakes 50 will be feeding ammunition to two hoists 122 (FIG. 1) mentioned here the first time, at a rapid rate. It will be remembered that both outer and inner rings 12, 33 are under positive motor drives. Without going into too much detail as to the manner of producing train of the mount 39*a*, it is deemed sufficient to state that as train impulses originate at the remote gun director said impulses are translated by an intermediate mechanism which produces rotations of said mount 39*a* in either direction at any speed as demanded by the gun director.

It was pointed out that the rotation of the inner ring, due to the drive motor 34 secured to trainable mount structure, is invariable in the clockwise direction at a constant rate relative to the mount. This assures delivery of rounds to the offtakes, 50, 50*a* at a constant rate upon demand. The aforesaid condition is not affected either by the velocity or direction of mount train. If, now, a train signal should be imposed upon the trainable mount in the clockwise direction, the inner ring will be observed to speed up in a clockwise direction relative to the deck by the degree of the train increment.

If, on the other hand, a counterclockwise train signal should be imposed upon the trainable mount, the inner ring will be observed to slow down with respect to the deck, even to the extent of going into reverse relative to the deck if the amplitude of the train signal should exceed the fixed rate of rotation of the inner ring relative to the trainable mount.

The outer ring being driven in the counterclockwise direction at its constant rate by the drive motor 19 is not affected by the foregoing mount train because said drive motor is secured to fixed structure externally of the ring assembly. The middle ring rotates in the clockwise direction when the mount train is clockwise or zero and, as in the instance of the inner ring, will be observed to stop and then rotate counterclockwise if the mount trains at a sufficient velocity in the counterclockwise direction.

The shuttles which are directly connected to the planetary gears will always rotate in the counterclockwise direction on their own axes but at variable speeds. The minimum speed of the planetary gears and consequently of the shuttles, occurring when the inside ring attains maximum velocity counterclockwise relative to the deck and under influence of maximum mount train speed in the counterclockwise direction, is such that a transfer rate never less than that required to obtain maximum firing rate of the mount for adequately sustained bursts will be maintained to the offtakes.

The maximum speed of the planetary gears will occur when the inner ring reaches maximum velocity clockwise relative to the deck under influence of maximum clockwise mount train. The planetary gears will always maintain counterclockwise rotation because under no condition does the inner ring reach the same velocity as the outer ring in the counterclockwise direction of rotation.

Obviously many modifications and variations of the present invention are possible in the light of the above teachings. It is therefore to be understood that within the scope of the appended claims the invention may be practiced otherwise than as specifically described.

What is claimed is:

1. Mechanism for rapidly and automatically transferring load units from a relatively stationary point to a trainable point of delivery, said mechanism comprising a concentricity of ring assemblies the individuals of which are rotatively operative adjacent to the stationary point and trainable point of delivery respectively to receive load units from the stationary point and to deliver them to said trainable point of delivery, said ring assemblies including an outer ring adjacent said stationary point, a middle ring, and an inner ring, said middle ring being rotatably mounted between the outer ring and the inner ring, and switching means carried by the middle ring for automatically switching load units from the outer ring across the middle ring to the inner ring in response to a load unit being delivered from the inner ring to the trainable point of delivery, said inner ring being continuously driven at a uniform speed relative to the trainable point of delivery, said outer ring being continuously driven at a uniform speed relative to said stationary point and opposite to that of said inner ring, the rotation of said middle ring being dependent upon the rate and direction of train of the point of delivery.

2. Mechanism for rapidly and automatically transferring load units from a relatively stationary point to a trainable point of delivery, said mechanism comprising a concentricity of ring assemblies the individuals of which are rotatively operative adjacent to the stationary point and trainable point of delivery, said ring assemblies including an outer ring adjacent said stationary point and continuously rotatable at a uniform speed relative to the stationary point, an inner ring adjacent said trainable point of delivery and continuously rotatable at a uniform speed relative to the point of delivery, and a middle ring carried between said inner and outer rings, the rotation of said middle ring being dependent upon the rate and direction of train of the point of delivery, a loader stationed on the stationary point being mechanically operative to feed load units one at a time to the outer ring, an offtake carried by the trainable point of delivery being mechanically operative to automatically convey away load units one a a time from the inner ring, means responding to a conveying operation of the offtake to remove a load unit from the inner ring and thereby create a vacancy on said ring, switching means carried by the middle ring for automatically switching a load unit from the outer ring to the inner ring thus to fill the vacancy on the inner ring and in turn create a vacancy on the outer ring, and means responding to the occurrence of the outer ring vacancy to set the loader in operation to automatically fill the outer ring vacancy.

3. Mechanism for automatically transferring load units from a relatively stationary point to a trainable point of delivery, said mechanism comprising a concentricity of ring assemblies the individuals of which are rotatively operative adjacent to the stationary point and trainable point of delivery to receive load units from the stationary point and to automatically deliver them to the trainable point of delivery, said ring assemblies including an outer ring adjacent said stationary point and continuously rotatable at a uniform speed relative to the stationary point, an inner ring adjacent said trainable point of delivery and continuously rotatable at a uniform speed relative to the point of delivery, and a middle ring carried between said inner and outer rings, the rotation of said middle ring being dependent upon the rate and direction of train of the point of delivery, and switching means carried by the middle ring and operative in response to the removal of a load unit from the inner ring to automatically switch a substitute load unit from the outer ring across the middle ring into the existing vacancy on the inner ring.

4. Mechanism for automatically transferring load units, said mechanism comprising a loader and an offtake each being charged with at least one of the load units, two independent ring assemblies continuously in rotational operation between the loader and the offtake, each being charged with at least one load unit supplied by the loader, and a switching apparatus in initially dormant status, said apparatus including a component common to both ring assemblies and other components respective to the loader and to the offtake, said switching apparatus being actuated during rotation of the ring assemblies by the removal of the unit from the offtake to advance the remaining units in sequence.

5. Mechanism for transferring load units, said mechanism comprising a step-operable but initially dormant loader and a step-operable but initially dormant offtake, both the loader and the offtake being charged with at least one of the units, two independent ring assemblies continuously in rotational operation between the loader and offtake, each being charged with at least one load unit supplied by the loader, and a switching apparatus in initially dormant status, said apparatus including a component common to both ring assemblies and other components respective to the loader and to the offtake, said switching apparatus being actuated during continuous rotation of the ring assemblies by the removal of the unit from the offtake to cause the two independent ring assemblies to impart a step-motion to each respective offtake and loader.

6. Mechanism for transferring load units from a stationary point to a point of delivery comprising a plurality of continuously rotating components having terminals at the respective stationary point and point of delivery, in which apparatus quantities of units are held in reserve until one unit is removed from the moving point of delivery terminal component, and means between each and all of the components becoming active by said removal to activate the components in progression, thus to advance all of the units by one through the storage apparatus to fill the vacancy in the moving point of delivery terminal and to abstract a substitute unit from the stationary point.

7. Mechanism for transferring load units from a stationary point to a point of delivery comprising a plurality of components having initially dormant terminals at the respective stationary point and point of delivery, and other constantly moving components operable intermediately of the dormant components, said apparatus holding quantities of units in reserve until one unit is removed from the point of delivery terminal component, and means activated by said removal to cause momentary utilization of the motion of the moving components to activate the dormant components, thereby to advance all of the units by one throughout the storage apparatus to fill the vacancy in the point of delivery terminal and to abstract a substitute unit from the stationary point.

8. Mechanism for transferring load units from a stationary point to a point of delivery comprising a plurality of components having initially dormant terminals at the respective stationary point and point of delivery, and other and constantly moving components operable intermediately of the dormant components, said apparatus holding quantities of units in reserve, and actuating means ready to set up a working intercoupling between each of the constantly moving components in serial order, the actuation of said means being automatically initiated by the removal of one unit from the point of delivery terminal.

9. Mechanism for transferring load units from a stationary point to a point of delivery comprising single initially dormant terminals at the respective stationary point and point of delivery and a pair of constantly moving components operable intermediately of the dormant terminals, said apparatus holding quantities of units in reserve, and actuating means ready to automatically set up a working intercoupling between each of the components, the removal of one unit from the point of delivery terminal automatically triggering the actuating means in serial order to transfer motion from the constantly moving components to the dormant components thereby to advance all of the load units by one throughout the storage apparatus.

10. Mechanism for transferring load units from a stationary point to a point of delivery comprising an initially dormant loader and offtake respectively adjacent to the stationary point and point of delivery, and two independent ring assemblies continuously in rotation between the loader and offtake, the loader, offtake and ring assemblies each being charged with load units, separate transfer means operatively associated with the respective loader and offtake, each transfer means being ready to set up a working intercoupling between the loader and offtake and the ring assemblies nearest thereto, and separate means embodied in the offtake and in the ring assembly nearest the loader respectively responsive to the removal of a load unit therefrom to actuate the respective transfer means during continuous rotation of the ring assemblies.

11. In a transfer mechanism, an initially dormant offtake charged with load units, a ring assembly also charged with load units and continuously in rotational operation adjacent the offtake, transfer means including means for closing an entrance to the offtake, and means actuated in response to the removal of a load unit from a position in said entrance for opening the entrance to the offtake and swing across the rotating ring assembly to thereby intercept a substitute load unit and transfer the latter by rotational motion of the ring assembly into the entrance position within the offtake.

12. In a transfer mechanism, an initially dormant offtake charged with load units, an endless conveyor also charged with load units and continuously in operation adjacent to the offtake, transfer means including a door member for closing an entrance to the offtake, and an interlocking electrical switch and cam system operated by the removal of a load unit from a position in the entrance of the offtake to swing the door open and across the endless conveyor to intercept a substitute load unit and transfer it by the motion of the conveyor into the entrance and the position previously occupied by the removed load unit.

13. In a transfer mechanism, an initially dormant offtake charged with load units, a drive and control unit for producing a step motion of the offtake, an endless conveyor also charged with load units and continuously in operation adjacent the offtake, a cam carried by said conveyor, transfer means for transferring load units from the conveyor to the offtake and including closure means for closing an entrance to the offtake, a ram having a piston operatively connected to the door, a fluid valve for the control of the ram and a solenoid for the control of the valve, an electrical circuit containing the solenoid and having a switch closable by said cam to move the closure means to open the entrance to the offtake and across the conveyor to thereby intercept a moving load unit, and means in said entrance to the offtake operated by engagement of the intercepted unit to actuate the drive and control unit.

14. In a transfer mechanism, an offtake for transporting load units, an endless conveyor charged with load units and continuously in operation adjacent to the offtake, transfer means normally closing an entrance to the offtake, operating means connected to the transfer means having connections to the transfer means for actuating the transfer means toward an extended position out over the conveyor, said operating means including a stationary roller actuated switch, and a switch cam traveling with the endless conveyor for actuating said roller switch, said cam having a long slope to ride against the roller and impart a load unit-diverting return movement of the transfer means toward the offtake entrance.

15. In a transfer mechanism, an offtake for transporting load units, an endless conveyor charged with load units and continuously in operation adjacent the offtake, transfer means closing an entrance to the offtake, a hydraulic ram with operating connections to the transfer means and an electrical control for the ram, said operating connections including a stationary roller switch, and a switch operating cam traveling with the endless conveyor, said cam having a steep face and primarily initiating the electrical control to actuate the ram, said steep face intercepting the roller as the cam advances to check the response of the transfer means to the hydraulic ram.

16. In a transfer mechanism, an offtake charged with load units and being operable for transporting them, a ring assembly encircling the offtake and in continuous rotation with a charge of load units, a door pivoted between the offtake and ring assembly, said door closing an entrance to the offtake and being operable to deflect a load unit from the rotating ring assembly in response to removal of a load unit from the offtake entrance, and means for operating the door in response to removal of a load unit from the offtake entrance and swing the door across the rotating ring assembly to intercept a load unit anywhere along the circular extent of the ring assembly and move the load unit to the offtake entrance.

17. In a transfer mechanism, an offtake charged with load units and being operable for transporting them, an endless circular conveyor encircling the offtake and charged with load units at regularly spaced stations, said conveyor being in continuous operation around its circular path, a door pivoted between the offtake and conveyor for closing an entrance to the offtake and operable to deflect a load unit from the circular conveyor upon removal of a load unit from the offtake entrance, means actuated in response to the removal of a load unit from the offtake entrance to swing the door on its pivot across the circular conveyor and intercept a load unit anywhere along the circular extent of the conveyor, and door closing means on the circular conveyor for moving the door into closing relation with the offtake entrance, the closing motion effecting a deflection of the load unit into the offtake entrance, there being one such door closing means at every load unit station on the circular conveyor.

18. In a transfer mechanism, an initially dormant offtake charged with a predetermined number of load units at spaced stations, means for cycling the offtake an amount equal to the distance between stations upon removal of a unit from one end of the offtake thereby producing a vacancy in the station at the other end of the offtake, an endless conveyor continuously moving beside the offtake also being charged with a predetermined number of load units at spaced stations, and means actuated in response to the occurrence of the vacancy in the offtake to pick off a load unit from the moving conveyor to fill the vacancy in the offtake.

19. In a transfer mechanism, a pair of endless conveyors, each charged with load units and moving continuously in opposite directions, a transfer cam stationed between said conveyors in readiness to transfer a load unit from one of the moving conveyors to the other moving conveyor, and means triggered by the removal of a load unit from said other moving conveyor to cause said transfer cam to perform its stated function.

20. In a transfer mechanism, a pair of endless conveyors, each of said conveyors having spaced stations charged with load units and moving continuously in opposite directions, a transfer cam positioned between the conveyors for transferring a load unit from one of the moving conveyors to the other moving conveyor, a plunger at each station of the conveyors, said plunger being depressed by the weight of the load unit standing thereon, and means for actuating the transfer cam in response to the removal of a load unit from said other moving conveyor and the consequent release of the weight from the plunger individual to the removed load unit.

21. In a transfer mechanism, inner and outer concentric rings rotating continuously in opposite directions and constituting a pair of endless conveyors, each of said rings having spaced stations charged with load units, a transfer cam stationed between the rings in readiness to transfer a load unit from the rotating outer ring to the rotating inner ring, a plunger in each station of the inner ring and being held down by the weight of the load unit standing thereon, and an operating interconnection between the plunger and the transfer cam, said interconnection being triggered into operation by the removal of a load unit from the inner ring and the consequent release of the weight from the individual to the removed load unit.

22. In a transfer mechanism, inner and outer concentric rings rotating continuously in opposite directions, each of said rings having spaced stations charged with load units, a transfer cam stationed between the rings, a control cam extending from said transfer cam, a spring tending to swing the transfer cam over the outer rotating ring to transfer a load unit from the outer rotating ring to the inner rotating ring, an arcuate cam at each inner ring station for intercepting the control cam to thereby hold the transfer cam in an inactive position, and a plunger at each inner ring station holding the arcuate cam individual thereto in a position to intercept the control cam as long as the plunger is held down by the respective load unit.

23. In a transfer mechanism, inner and outer concentric rings rotating continuously in opposite directions, each of said rings having spaced stations charged with load units, a transfer cam disposed between the rings, a control cam extending from said transfer cam, said transfer cam being spring-loaded and thereby urged to swing out over the outer ring to transfer a load unit from the outer ring to the inner ring, an arcuate cam at each inner ring station, said arcuate cams engaging the control cam in rapid recurrence to prevent the transfer cam from swinging to a transfer position over the outer ring, and a plunger at each inner ring station, each plunger being depressed by the load unit thereon to maintain the arcuate cam individual thereto in position for engagement with the control cam.

24. In a transfer mechanism, a continuously rotating outer ring charged with a reserve supply of load units, a continuously and oppositely rotating inner ring concentric to the outer ring and also charged with a supply of load units, a plunger at each inner ring load unit station, each of said plungers being depressed by the load unit respective thereto against a spring loading, a transfer cam positioned between the rings in readiness to transfer a load unit from the reserve on the outer ring to the inner ring in response to the removal of a load unit from the inner ring, a control cam extending from the transfer cam, and an arcuate cam connected to each plunger and depressed by the plungers to form a barrier against the control cam to prevent movement thereof until the control cam encounters a cavity left by the rising of a plunger and its arcuate cam upon removal of a load unit from the inner ring 25. In a transfer mechanism, inner and outer concentric oppositely rotating load unit supply rings, an upwardly biased plunger carried by the inner ring for each load unit to stand upon, a radially positioned cam connected to each plunger and forming a circumferential barrier, the removal of a load unit from its respective plunger, effecting a displacement of the radially positioned cam individual thereto to leave in effect a cavity, and a transfer cam situated between the rings for transferring a load unit from the outer ring to the inner ring, an extending control cam connected to said transfer cam and riding the barrier, the movement of the control cam into the cavity rendering the transfer cam effectual.

26. In a transfer mechanism, inner and outer concentric oppositely rotating load unit supply rings, plungers carried by the inner ring, one for each load unit to stand upon radially positioned cams connected to the plungers and forming a circumferential barrier, the removal of a load unit displacing the respective cam to leave in effect a cavity, a shuttle situated between the rings for transferring a load unit from the outer ring to the inner ring, and a transfer cam to divert load units from the outer ring to the shuttle, an extending control cam connected to said transfer cam and riding the barrier and depending on movement of the control cam into the cavity to render the transfer cam effective.

27. In a transfer mechanism, inner and outer concentric rings rotating continuously in opposite directions, each of said rings being charged with load units, a shuttle disposed between the rings to supply the inner ring with load units from the outer ring an intergearing between the rings and shuttle to impart constant rotation to the shuttle in one direction, a transfer cam to transfer a load unit from the outer ring to the shuttle, said transfer cam being in fixed relationship to the shuttle, and means triggered by the removal of a load unit from the inner ring to cause the transfer cam to perform its stated function.

28. In a transfer mechanism, inner and outer concentric rings rotating continuously in opposite directions, each of said rings being charged with load units, said rings having confronting ring gears, a middle ring positioned between the inner and outer rings, a shuttle on said middle ring for shifting load units onto the inner ring, said shuttle having a planetary gear in mesh with both ring gears thereby to be invariably driven in one direction, a transfer cam carried by and normally positioned within the confines of the middle ring, and means between the inner and middle rings for moving the transfer cam to a position overlying the outer ring to thereby deflect a load unit therefrom into the shuttle.

29. In a transfer mechanism, a continuously rotating ring for transporting rounds of ammunition to a point of removal, and a shutter assembly carried by the ring and demarcating a station at which a round is stood upright on its base flange, said assembly including spring-loaded shutters to partly encompass the round and keep it from falling over due to ring rotation.

30. In a transfer mechanism, a continuously rotating ring for transporting rounds of ammunition to a point of removal, and a shutter assembly carried by the ring and demarcating a station at which a round is stood upright on its base flange, said assembly including confronting shutters, said shutters being spring-loaded to close, a bracket affixed to the ring in which the shutters are pivoted, and lugs on the shutters striking the bracket and limiting the encompassment of the round by the shutters.

31. In a transfer mechanism, a continuously rotating ring for transporting rounds of ammunition to a point of removal, and a shutter assembly carried by the ring and demarcating a station at which a round is received and stood upright on its base flange, said assembly including confronting shutters, said shutters being spring-loaded to close a limited distance and leave an opening, a bracket affixed to the ring in which the shutters are pivoted, and guides on the bracket for directing the round into the opening.

32. In a transfer mechanism, a continuously rotating ring, a casing depending from a hole in said ring, a spring-loaded plunger slidable in the casing and having a beveled button as an upper extremity, said button partially extending above the ring, and transfer means for pushing a round of ammunition onto the ring and plunger, means for limiting the upthrust of the plunger under its spring loading so as not to reveal the bottom edge of the button above the top of the ring.

33. In a transfer mechanism, a middle ring across which rounds of ammunition are to be transferred, an arrangement of posts attached upright on the ring and having a continuous circular angle to which all of the upper ends of the posts are secured to complete a frame, an ammunition transfer means confined to said frame, said transfer means including a revolving shuttle assembly with bearings bracketed on one of the posts and in the ring, and a revoluble transfer cam for pushing the round into the shuttle assembly, said cam having bearings bracketed on an adjacent post and in the ring.

34. In a transfer mechnaism, a continuously rotating equally spaced circumferential stations, a cam extending radially from each of the stations, a transfer cam swingable from an ammunition source toward the moving ring to push rounds into the stations but being recurrently retarded by the radial cams to prevent functioning of the transfer cam as long as the stations remain filled, the respective radial cam being displaced by the removal of a round from a station thereby to allow the transfer cam to function, and means for momentarily delaying the displacement of the radial cam until the vacating round has cleared the station.

35. In a transfer mechanism, a radially positioned, constantly moving, swingable cam assuming a predetermined position in accordance with the weight of a round of ammunition present in a nearby station, an ammunition transfer cam to shift a constantly moving round into the station when vacated by a preceding round, and a flange on the transfer cam for maintaining the radial and transfer cams in face contact with one another until the preceding round has cleared the constantly moving station.

36. In a transfer mechanism, a constantly moving round-receiving station having a plunger-depressed, spring-raised, vertically swingable cam, a plunger operatively connected to said cam for moving the latter to and from a depressed position, said cam assuming the depressed position by weight of a round of ammunition on the plunger, an ammunition transfer cam having an extending control cam retained in an inoperative position by the vertically swingable cam when the latter is depressed, both transfer and control cams being horizontally swingable between inoperative and operative positions so that the transfer cam can swing to the operative position and shift a round of ammunition from a continuously moving source into the station when the latter is vacated by a preceding round, and a flange on the control cam engaging the vertically swingable cam to prevent upswinging from the retaining position and a resulting premature horizontal swinging of the transfer cam.

37. In a transfer mechanism, an ammunition transfer cam for shifting a round of ammunition from a continuously moving ammunition source into a continuously moving, vacant, ring ammunition station, and a buffer device to slow the cam toward the end of its shifting motion, said device including a spring-loaded button projecting from the transfer cam, and a detent cam stationary relative to said moving station, the button being positioned to ride on said detent cam.

38. In a transfer mechanism, a middle ring having a vacant ammunition station to be filled from a nearby continuously moving ammunition source, a transfer cam swingably mounted on the ring resiliently biased in one direction toward said source for the interception of a round carried by the continuously moving source, a cam mechanism for swinging the transfer cam in the other direction and shift the round into the vacant station, and a buffer device to eliminate any tendency of the transfer cam to rebound over the moving source, said device including a spring-loaded button projecting from the transfer cam parallel to its swinging axis, and a detent cam attached to the middle ring and onto which the button is adapted to ride to absorb the rebound energy of the transfer cam.

39. In a transfer mechanism, a transfer cam and a shaft to which the transfer cam is rigidly secured, a control cam pivotally carried by the shaft to turn independently of the shaft, two depending lugs on the control cam, an arm fixed on the shaft and having a housing, a lug on the housing confronting one of the depending lugs, and a spring-loaded plunger in the housing for maintaining contact with the other depending lug and for maintaining the confronting lugs in contact, said plunger providing for any required overtravel of the control cam on the shaft and consequent yielding of position relative to the transfer cam.

40. In a transfer mechanism, a continuously rotating ring having designated ammunition stations from any one of which a round is removable for delivery to a gun, a second ring surrounding the rotating ring, at least one transfer cam on said second ring for intercepting and switching rounds from a continuously moving source of supply onto the rotating ring to fill a vacant station, control cam connected to said transfer cam, a spring operatively connected to the transfer cam and control cam for exerting a turning effort on the two cams so that the transfer cam tends to swing out toward said moving source and the control cam is held in proximity to the rotating ring, and means embodied in each station for successively striking the control cam to suspend the function of the transfer cam until a vacancy occurs in an ammunition station on the rotating ring.

41. In a transfer mechanism, a continuously rotating outer ring having designated ammunition stations, a transfer cam to periodically abstracted a round of ammunition from the outer ring, thus leaving a vacant station, a loader beside the outer ring to refill the vacant station, and cam components respectively carried by the transfer cam and by the outer ring for temporarily retaining the transfer cam in an out-of-the-way position inwardly of the outer ring to allow the loader to refill vacant stations without interference from the transfer cam.

42. In a transfer mechanism, a continuously rotating outer ring having designated ammunition stations, a transfer cam periodically swingable outwardly of the outer ring to abstract a round of ammunition from the outer ring thus leaving a vacant station, a loader beside the outer ring to refill the vacant station, an extension of the transfer cam and swingable therewith, and a cam plate carried by the outer ring, said cam plate being positioned for intercepting the cam extension when said station becomes vacant to thereby retain the transfer cam in and out-of-the-way position inwardly of the outer ring to permit the loader to refill the station without interference from the transfer cam.

43. In a transfer mechanism, a continuously rotating inner ring having designated stations from which a round of ammunition is to be abstracted thus leaving a vacant station, a continuously rotating outer ring with a quota of rounds distributed over a plurality of ammunition stations, a transfer cam mounted to swing over the outer ring and remove one round from said quota and fill the vacant station of the inner ring, a loader beside the continuously rotating outer ring for filling outer ring stations, a spring-loaded element at each station of each ring, said spring-loaded elements being depressed when weighted by the rounds and elevated when the stations are vacant, and a system of cams having terminals at the respective elements and monuted for interaction when a vacancy occurs on the outer ring in conjunction with a vacancy on the inner ring and to temporarily defer said swinging of the transfer cam and permit the loader to fill the vacant outer ring station without interference from the transfer cam.

44. In a transfer mechanism, an ammunition offtake having an entrance to positions in the offtake for successive rounds, a spring-loaded round guide at the entrance, a spring-loaded latch for holding the guide in the round-receiving position, and a button on the latch exposed in the entrance and being engageable by the round when occupying the entrance to enable displacement of the guide when the round advances to the next position.

45. In a transfer mechanism, a feeder ring continuously revoluble and charged with a quota of rounds of ammunition, one round in each of a plurality of stations, an adjacent loader also charged with a quota of rounds, said loader being initially dormant and dependent for its operation to supply the stations on motion derived from the ring, and an intercoupling between the ring and loader for utilizing said motion to drive the loader from the ring, said intercoupling also being initially dormant but actuated by the removal of a round from any one of the stations.

46. In a transfer mechanism, a feeder ring continuously revoluble and charged with a quota of rounds of ammunition, one round in each of a plurality of stations, an initially dormant loader adjacent to the ring and charged with a quota of rounds, a cam and gear drive dependent on the motion of the ring for drivng the loader, and cam engaging means at each of the stations, said cam engaging means being movable from a retracted position to an extended position upon the occurrence of a round vacancy at the respective station to engage the cam and operate the gearing and thereby drive the loader.

47. In a transfer mechanism, a continuously rotating ring charged with a round of ammunition in each of a plurality of stations, and initially dormant ring loader adjacent to the ring and also charged with a round of ammunition in each of a plurality of stations, and means bridging the distance between the loader and ring for converting the motion of the ring to energy for operating the loader, said means being set in operation by the removal of a round from any one of the ring stations to pick off a substitute round from the loader and to move the loader one step to advance its rounds toward the pick-off point.

48. In a transfer mechanism, a continuously rotating ring having an initially retracted spindle structure at each of a plurality round ammunition stations, instrumentality to extend the spindle structure at any station upon removal of the respective round, and initially dormant loader to keep the ring supplied, gear means to drive the loader by means of the continuously rotating ring, and a barrel cam having a helical groove receiving a terminal of the spindle structure and driving the gear means by ring power for the duration of the sweep of the terminal from end to end of the helical groove in the barrel cam.

49. In a transfer mechanism, a loader and gearing to drive the loader, a barrel cam coupled to the gearing and having spiral grooves pitched for turns of the cam of a predetermined angular extent to drive the gearing, a spindle structure adapted to enter one end of a given groove, said spindle structure traversing a level plane toward the other end of the groove to impart rotation to the cam due to the pitch of the groove and thereafter leave the groove, and a latch to enter one of the grooves after said rotation to temporarily lock the barrel against further rotation.

50. In a transfer mechanism, a loader and gearing to drive the loader, a barrel cam coupled to the gearing and having spiral grooves pitched for turns of the cam of a predetermined angular extent to drive the gearing, a spindle structure constrained to traverse the plane of the axis of the barrel cam, an end of said spindle structure entering one end of a given groove and traveling the length of the groove to impart rotary movement to the cam, and a cam block at the other end of each groove, the respective cam block displacing the spindle structure out of said groove.

51. In a transfer mechanism, a continuously rotating ring, an initially retracted spring-loaded spindle structure at each of a plurality of ammunition stations on said ring, a button protruding from the ring at each station, linkage terminating at the respective spindle structure and connecting said button to said spindle structure, said spindle structure at any station being projected because of the spring loading thereon in response to the removal of ammunition from the respective button, an initially dormant loader holding rounds in reserve for the ring, and initially dormant drive means for the loader, said drive means including a cam confronting the ring to be actuated by the spindle structure and impart the movement of the ring to drive the loader and replenish the vacant station.

52. In a transfer mechanism, a loader, gearing to drive the loader, a barrel cam coupled to the gearing and having at least one spiral groove pitched for a turn of the cam to drive the gearing, means moving adjacent to the barrel cam, and a driver for the cam projecting from the loader, periodically entering and traversing the length of the groove on a plane coincident with the axis of the cam, to impart the motion of said means to the barrel cam and thence to the loader.

53. In a transfer mechanism, a barrel cam having drive grooves each with an entrance, a driver carried externally of the cam and arranged to enter the entrance and traverse the length of a groove on a path parallel to the axis of the cam thereby to turn the cam, a latch occupying part of one of the grooves to lock the cam prior to its turning, and a latch lever connected to the latch and stationed at the groove entrance to be struck by the driver to raise and disconnect the latch.

54. In a transfer mechanism, a barrel cam having drive grooves each with an entrance, a driver carried externally of the cam and arranged to enter the entrance and traverse the length of a groove on a path parallel to the axis of the cam thereby to turn the cam, a latch occupying part of one of the grooves to lock the cam prior to its turning, and a latch lever connected to the latch and stationed at the groove entrance, said latch lever being stepped for a progressive raising of the latch, the engagement of the first step and the advance of the driver into the entrance producing a partial raising of the latch, the full raising of the latch being deferred until the driver has passed from the second step and has entered the groove.

55. In a transfer mechanism, a loader, gearing to drive the loader, a barrel cam coupled to the gearing and having at least one spiral groove pitched for a turn of the cam to drive the gearing, a driver for the cam carried externally of the loader and adapted to traverse the length of the groove on a plane coincident with the axis of the cam, and means to prevent the driver from entering the groove in the event of an improper orientation of the driver in respect to the barrel cam.

56. In a transfer mechanism, a loader, a continuously rotating ring having a plurality of round stations, a spring-loaded spindle structure at every station radially projectable when an absence of a round occurs at the station individual to said spindle structure, a plurality of initially dormant loaders to keep the continuously rotating ring supplied, said loaders being charged with ammunition and distributed circumferentially of the ring, said loaders being of less number than the round stations, drive means at each loader, each of said drive means requiring for its operation and for its operation of the respective loader the driving engagement of a projected spindle structure, and means intervening between the approaching spindle structure and the nearest drive means of the loaders to insure the driving engagement only in the event of a precise interrelation of a vacant one of the predominating stations.

57. In a transfer mechanism, a loader, gearing to drive the loader, a barrel cam coupled to the gearing and having at least one spiral groove pitched for a turn of the cam to drive the gearing, a continuously moving cam driver projectable toward the cam and confined in its travel to a plane coincident with the axis of the cam, said cam driver being adapted to begin at an entrance to the groove and thereupon traverse the length of it, a latch to lock the cam to prevent rotation thereof, a latch lever connected to the latch and situated near said entrance, said latch preventing rotation of the cam until the latch lever is displaced by the driver, and a cam face on the latch lever to deflect the driver from the entrance in the event of projection of the driver too late to enter the entrance but early enough to displace the latch lever and latch.

58. In a transfer mechanism, an ammunition loader having initially dormant step-movable flights at predeterminedly spaced round positions, gearing having one terminal at the loader to drive the flights, an external driver to sweep past the loader, and a cam at the other terminal of the gearing so proportioned that the duration of one engagement of the driver with the cam produces a step of all of the flights equal to the amount of their spacing.

59. In a transfer mechanism, a continuously rotating ammunition ring having a plurality of round stations, a transfer cam operative to pivotally extend out over the ring and back again into a retracted position to vacate one of the stations by intercepting and removing the round carried at that station, an initially dormant loader charged with ammunition to supply the ring, drive means operated by the removal of said round to actuate the loader and discharge a round for refilling the vacant station, and means to temporarily prevent the operation of the drive means in case of a prospective premature discharge of the round into the path of the leading edge of the transfer cam.

60. In a transfer mechanism, a continuously rotating ammunition ring, an upwardly spring-loaded mushroom button depressed by superposed ammunition at each of a plurality of circumferentially distributed stations, the removal of a round from a station enabling the respective button to rise, a dormant loader adjacent to the continuously rotating ring, drivable means for the loader including a barrel cam with a spiral groove, a linkage extending from each button and terminating in driver means exposed at the periphery of the ring for projection into and riding within a cam groove in response to the release of the respective button to operate the loader, and a two-part structure included in said linkage, said two-part structure including means to yield in the event of a premature depression of said button so that the driver means will remain in the groove until the completion of the loading cycle.

61. In a transfer mechanism, an initially dormant loader having a platform onto which rounds are placed base flange down, guides situated an appropriate distance up from the platform to override the base flanges and hold the rounds perpendicular to the platform, drive means to periodically actuate the loader for the disposal of its rounds, and means working through the platform in coaction with the guides to block a round in the event of an attempt to place it while the loader is in the act of round disposal.

62. In a transfer mechanism, a fully loaded continuously rotating ammunition ring from which rounds are taken, an initially dormant loader charged with rounds to supply the ring and to be manually replenished with new rounds as previously inserted rounds are delivered from the loader to the ring, initially dormant drive means for the loader, driver means carried by the ring and extending to the drive means to set it in operation every time a round is taken from the ring, and means in the loader to prevent a new round from insertion into the loader in the event insertion is attempted while the driver means is in the act of starting the operation of the drive means.

63. In a transfer mechanism, a fully loaded continuously rotating ammunition ring from which rounds are to be removed, an initially dormant loader charged with rounds to supply the ring, said loader being manually replenished with new rounds as previously inserted rounds are delivered from the loader to the ring, initially dormant drive means for the loader, driver means carried by the continuously rotating ring and extending to the drive means to set it in operation every time a round is removed from the ring, obstructing means projecting into the loader but depressable by succeeding new rounds, and a linkage extending from the obstructing means to a terminal in the path of the driver, in turn to be obstructed by the driver if the latter is in the act of starting the operation of the drive means thus to hold the obstructing means rigid in the loader and prevent the insertion of a new round.

64. In a transfer mechanism, a manually chargeable loader having a platform position at which the rounds are to be emplaced, a rotatably mounted barrel cam to drive the loader, drive means extensible to a registering position to make driving connection with the barrel cam, and means to prevent the driver means from staying in said registering position should the operator be in the act of emplacing a round at said platform position, said means comprising a safety slide initially receded from the driver means, an operating cam on which the round must be set at said platform position, and a linkage between the operating cam and slide for moving the slide and thereby deflect the driver means.

65. In a transfer mechanism, an ammunition loader having a platform position at which rounds are to be set, a barrel cam drive for the loader having a cam groove, a driver roller extensible into registration with the groove entrance and movable on a prescribed path to drive the barrel cam and loader, a safety slide initially receded from the roller, a head on said safety slide and engageable by the roller, and an operating cam at said platform position and depressible by the round, a linkage connection between the operating cam and the safety slide to move the safety slide head into the path of the roller and deflect it out of registration with the groove entrance.

66. In a transfer mechanism, a manually chargeable ammunition loader serving as an ammunition supply, chain-driven flights and guides in the loader for respectively spacing and supporting the rounds therein, and a spring-loaded shutter coacting with the trailing edge of the last flight to back stop the last round loaded.

References Cited in the file of this patent

UNITED STATES PATENTS

| | | |
|---|---|---|
| 869,632 | Hockett | Oct. 29, 1907 |
| 1,528,893 | Rother | Mar. 10, 1925 |
| 2,456,620 | Chadwick et al. | Dec. 21, 1948 |
| 2,462,836 | Barker et al. | Mar. 1, 1949 |